United States Patent
Liu et al.

(10) Patent No.: US 10,631,292 B2
(45) Date of Patent: Apr. 21, 2020

(54) TERMINAL APPARATUS, BASE STATION APPARATUS, COMMUNICATION METHOD, AND INTEGRATED CIRCUIT

(71) Applicant: Sharp Kabushiki Kaisha, Sakai, Osaka (JP)

(72) Inventors: Liqing Liu, Sakai (JP); Shoichi Suzuki, Sakai (JP); Tatsushi Aiba, Sakai (JP); Takashi Hayashi, Sakai (JP); Tomoki Yoshimura, Sakai (JP); Wataru Ouchi, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/099,463

(22) PCT Filed: Apr. 28, 2017

(86) PCT No.: PCT/JP2017/016932
§ 371 (c)(1),
(2) Date: Nov. 7, 2018

(87) PCT Pub. No.: WO2017/195659
PCT Pub. Date: Nov. 16, 2017

(65) Prior Publication Data
US 2019/0223176 A1 Jul. 18, 2019

(30) Foreign Application Priority Data
May 12, 2016 (JP) .................. 2016-096500

(51) Int. Cl.
*H04W 72/04* (2009.01)
*H04W 76/10* (2018.01)
(Continued)

(52) U.S. Cl.
CPC ....... *H04W 72/0446* (2013.01); *H04L 5/0053* (2013.01); *H04W 48/12* (2013.01);
(Continued)

(58) Field of Classification Search
CPC .... H04L 5/0053; H04W 48/12; H04W 72/04; H04W 72/042; H04W 72/0446; H04W 76/10
See application file for complete search history.

(56) References Cited

U.S. PATENT DOCUMENTS

2011/0141991 A1* 6/2011 Gao .................. H04L 1/1896
370/329
2011/0171985 A1* 7/2011 Papasakellariou .... H04W 72/02
455/509
(Continued)

FOREIGN PATENT DOCUMENTS

EP 3 280 086 A1 2/2018

OTHER PUBLICATIONS

Official Communication issued in International Patent Application No. PCT/JP2017/016932, dated Jul. 18, 2017.
(Continued)

*Primary Examiner* — Stephen J Clawson
(74) *Attorney, Agent, or Firm* — Keating & Bennett, LLP

(57) ABSTRACT

A terminal apparatus includes a higher layer processing unit configured to configure transmission mode information; and a reception unit configured to receive a physical downlink shared channel and a short physical downlink shared channel, and the transmission mode information indicates a transmission mode for the physical downlink shared channel and a transmission mode for the short physical downlink shared channel.

6 Claims, 19 Drawing Sheets

(51) Int. Cl.
  *H04L 5/00* (2006.01)
  *H04W 48/12* (2009.01)
(52) U.S. Cl.
  CPC ......... *H04W 72/04* (2013.01); *H04W 72/042* (2013.01); *H04W 76/10* (2018.02)

(56) References Cited

U.S. PATENT DOCUMENTS

| | | | |
|---|---|---|---|
| 2016/0119947 A1* | 4/2016 | Park | H04L 5/0055 370/329 |
| 2017/0105206 A1* | 4/2017 | Maattanen | H04L 5/0037 |
| 2017/0171842 A1* | 6/2017 | You | H04L 5/0048 |
| 2017/0230994 A1* | 8/2017 | You | H04W 72/042 |

OTHER PUBLICATIONS

Ericsson, "Design of DL DCI for short TTI", 3GPP TSG RAN WG1 Meeting #84, R1-160931, Feb. 15-19, 2016, pp. 1-5.
Ericsson, "Physical layer aspects of short TTI for downlink transmissions", 3GPP TSG RAN WG1 Meeting #84, R1-160934, Feb. 15-19, 2016, pp. 1-4.
Huawei et al., "Discussion on CSI feedback for short TTI", 3GPP TSG RAN WG1 Meeting #84bis, R1-162589, Apr. 11-15, 2016, 3 pages.
Nokia, et al.; "On design of DL control channel for shorter TTI operation"; 3GPP TSG-RAN WG1 Meeting #84bis; R1-163267; Mar. 11-15, 2016; pp. 1-5.
Huawei, et al.; "DCI design for short TTI"; 3GPP TSG RAN WG1 Meeting #84bis; R1-162588; Apr. 11-15, 2016; 11 pages.
"Physical layer procedures (Release 13)"; 3rd Generation Partnership Project Technical Specification Group Radio Access Network; Evolved Universal Terrestrial Radio Access (E-UTRA); 3GPP TS 36.213; vol. 13.1.1; Mar. 31, 2016; pp. 45-254.

\* cited by examiner

|  | sTTI length ≧ K1 | sTTI length < K1 |
|---|---|---|
| sPDCCH | CRS or DMRS ports | CRS ports |
| sPDSCH | CRS or DMRS ports | CRS or DMRS ports |

FIG. 7

|  | SPDCCH length ≧K2 | sPDCCH length＜K2 |
|---|---|---|
| sPDCCH | DMRS ports | CRS ports |

FIG. 8

|  | sPDSCH length $\geq$ K3 | sPDSCH length $<$ K3 |
|---|---|---|
| sPDSCH | DMRS ports | CRS ports |

FIG. 9

| Transmission mode | DCI format | Transmission scheme of PDSCH corresponding to PDCCH |
|---|---|---|
| Mode 1 | DCI format 1A | Single-antenna port, CRS port 0 |
| | DCI format 1 | Single-antenna port, CRS port 0 |
| Mode 2 | DCI format 1A | Transmit diversity (CRS-based) |
| | DCI format 1 | Transmit diversity (CRS-based) |
| Mode 3 | DCI format 1A | Transmit diversity (CRS-based) |
| | DCI format 2A | Large delay CDD or Transmit diversity (CRS-based) |
| Mode 4 | DCI format 1A | Transmit diversity (CRS-based) |
| | DCI format 2 | Closed-loop spatial multiplexing or Transmit diversity (CRS-based) |
| Mode 5 | DCI format 1A | Transmit diversity, CRS port 0-3 |
| | DCI format 1D | Multi-user MIMO (CRS-based) |
| Mode 6 | DCI format 1A | Transmit diversity (CRS-based) |
| | DCI format 1B | Closed-loop spatial multiplexing using a single transmission layer (CRS-based) |
| Mode 7 | DCI format 1A | If the number of PBCH antenna ports is one, Single-antenna port, CRS port 0 is used, otherwise Transmit diversity (CRS-based) |
| | DCI format 1 | Single-antenna port, DMRS port 5 |
| Mode 8 | DCI format 1A | If the number of PBCH antenna ports is one, Single-antenna port, CRS port 0 is used, otherwise Transmit diversity |
| | DCI format 2B | Dual layer transmission, DMRS ports 7 and 8 or single-antenna port, DMRS port 7 or 8 |
| Mode 9 | DCI format 1A | • Non-MBSFN subframe: If the number of PBCH antenna ports is one, Single-antenna port, CRS port 0 is used, otherwise Transmit diversity<br>• MBSFN subframe: Single-antenna port, DMRS port 7 |
| | DCI format 2C | Up to 8 layer transmission, DMRS ports 7-14 or single-antenna port, port 7, 8, 11, or 13 if UE is configured with higher layer parameter *dmrs-tableAlt*, single-antenna port, port 7 or 8 otherwise |
| Mode 10 | DCI format 1A | • Non-MBSFN subframe: If the number of PBCH antenna ports is one, CRS Single-antenna port, port 0 is used, otherwise Transmit diversity<br>• MBSFN subframe: Single-antenna port, DMRS port 7 |
| | DCI format 2D | Up to 8 layer transmission, DMRS ports 7-14 or single-antenna port, DMRS port 7, 8, 11, or 13 if UE is configured with higher layer parameter *dmrs-tableAlt*, single-antenna port, DMRS port 7 or 8 otherwise |

FIG. 13

| Transmission mode | DCI format | Transmission scheme of sPDSCH corresponding to sPDCCH |
|---|---|---|
| Mode 1 | DCI format X1 | Single-antenna port, CRS port 0 |
| | DCI format X2 | Single-antenna port, CRS port 0 |
| Mode 2 | DCI format X1 | Transmit diversity (CRS ports) |
| | DCI format X2 | Transmit diversity (CRS ports) |
| Mode 3 | DCI format X1 | Transmit diversity (CRS ports) |
| | DCI format X3 | Large delay CDD or Transmit diversity (CRS ports) |
| Mode 4 | DCI format X1 | Transmit diversity (CRS ports) |
| | DCI format X4 | Closed-loop spatial multiplexing or Transmit diversity (CRS ports) |
| Mode 5 | DCI format X1 | Transmit diversity, CRS ports 0-3 |
| | DCI format X5 | Multi-user MIMO (CRS ports) |
| Mode 6 | DCI format X1 | Transmit diversity (CRS ports) |
| | DCI format X6 | Closed-loop spatial multiplexing using a single transmission layer (CRS port) |
| Mode 7 | DCI format X1 | If the number of PBCH antenna ports is one, Single-antenna port, CRS port 0 is used, otherwise Transmit diversity (CRS ports) |
| | DCI format X2 | Single-antenna port, DMRS port 5 |
| Mode 8 | DCI format X1 | If the number of PBCH antenna ports is one, Single-antenna port, CRS port 0 is used, otherwise Transmit diversity (CRS ports) |
| | DCI format X7 | Dual layer transmission, DMRS port 7 and 8 or single-antenna port, DMRS port 7 or 8 |
| Mode 9 | DCI format X1 | • Non-MBSFN subframe: If the number of PBCH antenna ports is one, Single-antenna port, CRS port 0 is used, otherwise Transmit diversity (CRS ports)<br>• MBSFN subframe: Single-antenna port, DMRS port 7 |
| | DCI format X8 | Up to 8 layer transmission, DMRS ports 7-14 or single-antenna port, DMRS port 7, 8, 11, or 13 if UE is configured with higher layer parameter *dmrs-tableAlt*, single-antenna port, DMRS port 7 or 8 otherwise |
| Mode 10 | DCI format X1 | • Non-MBSFN subframe: If the number of PBCH antenna ports is one, CRS Single-antenna port, port 0 is used, otherwise Transmit diversity(CRS ports)<br>• MBSFN subframe: Single-antenna port, DMRS port 7 |
| | DCI format X9 | Up to 8 layer transmission, DMRS ports 7-14 or single-antenna port, DMRS port 7, 8, 11, or 13 if UE is configured with higher layer parameter *dmrs-tableAlt*, single-antenna port, DMRS port 7 or 8 otherwise |

FIG. 14

| Transmission mode | DCI format | Transmission scheme of sPDSCH corresponding to sPDCCH |
|---|---|---|
| Mode Z1 | DCI format S1 | • sTTI length < K: CRS ports, Single antenna or Transmission<br>• sTTI length ≧ K: DMRS ports, Spatial Multiplexing |
| | DCI format S2 | • sTTI length < K: CRS ports, Spatial Multiplexing<br>• sTTI length ≧ K: DMRS ports, Spatial Multiplexing |
| Mode Z2 | DCI format S1 | • CRS ports, Single antenna or Transmission Diversity |
| | DCI format S3 | • CRS ports, Spatial Multiplexing |
| Mode Z3 | DCI format S1 | • DMRS ports, Single antenna or Transmission Diversity |
| | DCI format S4 | • DMRS ports, Spatial Multiplexing |

FIG. 15

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method and an integrated circuit.

This application claims priority based on JP 2016-096500 filed on May 12, 2016, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)" or "Evolved Universal Terrestrial Radio Access (EUTRA)", and a radio access method and a radio network for achieving data communications with higher speed by using a wider frequency range (hereinafter referred to as "Long Term Evolution-Advanced (LTE-A), or, "Advanced Evolved Universal Terrestrial Radio Access (A-EUTRA)") have been studied (see NPL 1 and NPL 2). In LTE and LTE-A, a base station apparatus is also referred to as an evolved NodeB (eNodeB), and a terminal apparatus is also referred to as a User Equipment (UE). LTE and LTE-A are cellular communication systems in which an area is divided into multiple cells to form a cellular pattern, each of the cells being served by a base station apparatus. In some situation, a single base station apparatus manages multiple cells.

In LTE-A, a base station apparatus schedules assignment of a radio resource such as the frequency band and the transmission power for a terminal apparatus. The minimum assignment unit of a radio resource is called Resource block (RB). A single RB includes 12 subcarriers in the frequency direction, and seven or six symbols in the time direction. The minimum time unit of scheduling is a subframe, and is also referred to as Transmission Timing Interval (TTI).

In 3GPP, use of a shorten TTI (sTTI), which is shorter than a TTI, is studied in order to reduce packet delay (see NPL 1 and NPL 2).

CITATION LIST

Non Patent Literature

NPL 1: Ericson, "Design of DL DCI for short TTL", 3GPP TSG RAN WG1 Meeting #84, R1-160931, 6 Feb. 2016.
NPL 2: Ericson, "Physical layer aspects of short TTI for downlink transmissions", 3GPP TSG RAN WG1 Meeting #84, R1-160934, 6 Feb. 2016.

SUMMARY OF INVENTION

Technical Problem

However, use of an sTTI has not been sufficiently studied.

An aspect of the present invention has been made in light of the foregoing, and an object of the aspect of the present invention is to provide a terminal apparatus, a base station apparatus, a communication method, and an integrated circuit, which enable efficient communications using an sTTI.

Solution to Problem (1) A first aspect of the present invention made in light of the foregoing is a terminal apparatus including: a higher layer processing unit configured to configure transmission mode information; and a reception unit configured to receive a physical downlink shared channel and a short physical downlink shared channel, wherein the transmission mode information indicates a transmission mode for the physical downlink shared channel and a transmission mode for the short physical downlink shared channel.

(2) A second aspect of the present invention made in light of the foregoing is a base station apparatus including: a higher layer processing unit configured to configure transmission mode information in a terminal apparatus; and a transmission unit configured to transmit a physical downlink shared channel and a short physical downlink shared channel, wherein the transmission mode information indicates a transmission mode for the physical downlink shared channel and a transmission mode for the short physical downlink shared channel.

(3) A third aspect of the present invention made in light of the foregoing is a communication method used for a terminal apparatus, the communication method including: configuring transmission mode information; and receiving a physical downlink shared channel and a short physical downlink shared channel, wherein the transmission mode information indicates a transmission mode for the physical downlink shared channel and a transmission mode for the short physical downlink shared channel.

(4) A fourth aspect of the present invention made in light of the foregoing is a communication method used for a base station apparatus, the communication method including: configuring transmission mode information in a terminal apparatus; and transmitting a physical downlink shared channel and a short physical downlink shared channel, wherein the transmission mode information indicates a transmission mode for the physical downlink shared channel and a transmission mode for the short physical downlink shared channel.

(5) A fifth aspect of the present invention made in light of the foregoing is an integrated circuit to be mounted in a terminal apparatus, the integrated circuit being configured to perform: a higher layer processing function of configuring transmission mode information; and a reception function of receiving a physical downlink shared channel and a short physical downlink shared channel, wherein the transmission mode information indicates a transmission mode for the physical downlink shared channel and a transmission mode for the short physical downlink shared channel.

(6) A sixth aspect of the present invention made in light of the foregoing is an integrated circuit to be mounted in a base station apparatus, the integrated circuit being configured to perform: a higher layer processing function of configuring transmission mode information in a terminal apparatus; and a transmission function of transmitting a physical downlink shared channel and a short physical downlink shared channel, wherein the transmission mode information indicates a transmission mode for the physical downlink shared channel and a transmission mode for the short physical downlink shared channel.

Advantageous Effects of Invention

According to an aspect of the present invention, communications can be efficiently performed.

BRIEF DESCRIPTION OF DRAWINGS

FIG. 7 is a diagram illustrating an example of an sTTI length determination table according to the first embodiment of the present invention.

FIG. 8 is a diagram illustrating an example of an sPDCCH length determination table according to the first embodiment of the present invention.

FIG. 9 is a diagram illustrating an example of an sPDSCH length determination table according to the first embodiment of the present invention.

FIG. 13 is a schematic diagram illustrating an example in a DCI format of a transmission mode for a PDSCH according to a second embodiment of the present invention.

FIG. 14 is a schematic diagram illustrating an example of a DCI format in a transmission mode for an sPDSCH according to the second embodiment of the present invention.

FIG. 15 is a schematic diagram illustrating another example of a DCI format in a transmission mode for the sPDSCH according to the second embodiment of the present invention.

DESCRIPTION OF EMBODIMENTS

Embodiments of the present invention are described below in detail with reference to the drawings.

First Embodiment

Figure 1:
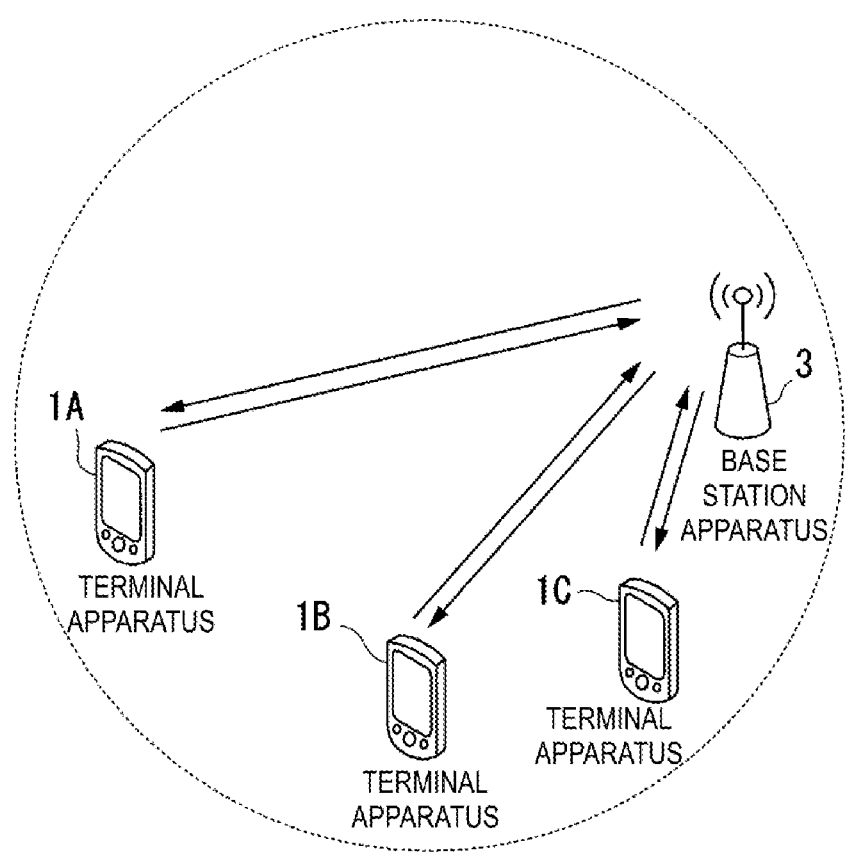
FIG. 1 is a schematic diagram illustrating an example of a configuration of a radio communication system according to a first embodiment of the present invention.

FIG. 1 is a schematic diagram illustrating an example of a configuration of a radio communication system according to a first embodiment of the present invention.

In FIG. 1, the radio communication system includes a terminal apparatus 1A, a terminal apparatus 1B, a terminal apparatus 1C, and a base station apparatus 3. Hereinafter, the terminal apparatuses 1A to 1C are also referred to as a terminal apparatus 1.

The terminal apparatus 1 performs radio communications with the base station apparatus 3.

Note that the radio communication system may include a Mobility Management Entity (MME)/Gateway (GW) apparatus in a core network, another base station apparatus, a terminal apparatus that communicates with another base station apparatus and the like. In the case that multiple base station apparatuses are provided, the base station apparatus is connected with the MME/GW apparatus through a backhaul link S1 (also referred to as S1 link), and the base station apparatuses are connected with each other through a backhaul link X2 (also referred to as X2 link).

Physical channels and physical signals according to the present embodiment will be described.

In FIG. 1, in uplink radio communication from the terminal apparatus 1 to the base station apparatus 3, the following uplink physical channels are used. Here, the uplink physical channels are used to transmit information output from the higher layers.

Physical Uplink control Channel (PUCCH)
short Physical Uplink control Channel (sPUCCH)
Physical Uplink Shared Channel (PUSCH)
short Physical Uplink Shared Channel (sPUSCH)
Physical Random Access Channel (PRACH)
short Physical Random Access Channel (sPRACH)

The PUCCH (Physical Uplink Control Channel) and/or the sPUCCH (short Physical Uplink Control Channel) is used to transmit Uplink control Information (UCI). In the following description, the PUCCH may include sPUCCH. Here, the uplink control information (UCI) may include Channel State Information (CSI) used to indicate a state of a downlink channel. The uplink control information may include a Scheduling Request (SR) used to request a UL-SCH resource. The uplink control information may include Hybrid Automatic Repeat request ACKnowledgment (HARQ-ACK).

Here, HARQ-ACK may indicate HARQ-ACK for downlink data (Transport block, Medium Access control Protocol Data Unit (MAC PDU), Downlink-Shared Channel (DL-SCH), or Physical Downlink Shared Channel (PDSCH)). In other words, HARQ-ACK may indicate acknowledgement or positive-acknowledgment (ACK), or negative-acknowledgement (NACK) for downlink data. Here, HARQ-ACK is also referred to as ACK/NACK, HARQ feedback, HARQ response, HARQ information, or HARQ control information.

The PUSCH (Physical Uplink Shared Channel) and/or sPUSCH (short Circuit Physical Uplink Shared Channel) is used to transmit uplink data (Uplink-Shared Channel (UL-SCH)). In the following description, the PUSCH may include the sPUSCH. Furthermore, the PUSCH may be used to transmit HARQ-ACK and/or CSI along with the uplink data. Furthermore, the PUSCH may be used to transmit CSI only or HARQ-ACK and CSI only. In other words, the PUSCH may be used to transmit the uplink control information only.

Here, the base station apparatus 3 and the terminal apparatus 1 may exchange (transmit and/or receive) signals with each other in their respective higher layers. For example, the base station apparatus 3 and the terminal apparatus 1 may transmit and/or receive RRC signaling (also referred to as RRC message or RRC information) in a Radio Resource control (RRC) layer. The base station apparatus 3 and the terminal apparatus 1 may exchange (transmit and/or receive) a Medium Access Control (MAC) control element in a MAC layer. Here, the RRC signaling and/or the MAC control element is also referred to as higher layer signaling.

Here, in the present embodiment, "parameter of a higher layer," "message of a higher layer" "signal of a higher layer," "information of a higher layer," and, "information of a higher layer element" may be identical.

The PUSCH may be used to transmit the RRC signaling, and the MAC control element. Here, the RRC signaling transmitted from the base station apparatus 3 may be signaling common to multiple terminal apparatuses 1 in a cell. The RRC signaling transmitted from the base station apparatus 3 may be a signaling dedicated (individualized) to a certain terminal apparatus 1 (also referred to as dedicated signaling). In other words, user-equipment-specific information (information unique to user equipment) may be transmitted through signaling dedicated to the certain terminal apparatus 1.

The physical random access channel (PRACH), and/or the sPRACH (short Physical Random Access Channel) is used to transmit a random access preamble. In the following description, the PRACH may include the sPRACH. For example, a main object of the PRACH (or, random access procedure) is to synchronize the mobile station device 1 to the base station apparatus 3 in terms of the time domain. The PRACH (or, random access procedure) may also be used for an initial connection establishment procedure, a handover procedure, a connection re-establishment procedure, uplink transmission synchronization (timing adjustment), and transmission of a scheduling request (a PUSCH resource request, a UL-SCH resource request).

In FIG. 1, the following uplink physical signal is used in the uplink radio communication. Here, the uplink physical signal is not used to transmit information output from the higher layers but is used by the physical layer.

Uplink Reference Signal (ULRS)

According to the present embodiment, the following two types of uplink reference signals are used.

Demodulation Reference Signal (DMRS)
Sounding Reference Signal (SRS)

The demodulation reference signal (DMRS) is associated with transmission of the PUSCH, the sPUSCH, and/or the PUCCH. In other words, the DMRS may be time-multiplexed with the PUSCH, the sPUSCH, or the PUCCH. For example, the base station apparatus 3 may use the DMRS to perform channel compensation of the PUSCH, the sPUSCH, or the PUCCH. In the following description, transmission of the PUSCH together with the DMRS is also referred to simply as transmission of the PUSCH. Furthermore, transmission of the sPUSCH together with the DMRS is also referred to simply as transmission of the sPUSCH. Furthermore, transmission of the PUCCH together with DMRS is also referred to simply as transmission of the PUCCH.

The sounding reference signal (SRS) is not associated with transmission of the PUSCH or the PUCCH. For example, the base station apparatus 3 may use the SRS to measure an uplink channel state.

In FIG. 1, the following downlink physical channels are used for downlink radio communication from the base station apparatus 3 to the terminal apparatus 1. Here, the downlink physical channels are used to transmit the information output from the higher layers.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
short Physical Downlink Control Channel (sPDCCH)
Physical Downlink Shared Channel (PDSCH)
short Physical Downlink Shared Channel (sPDSCH)
Physical Multicast Channel (PMCH)

The physical broadcast channel (PBCH) is used to broadcast a Master Information Block (MIB, a Broadcast Channel (BCH)) that is shared by the terminal apparatuses 1.

The physical control format indicator channel (PCFICH) is used to transmit information indicating a region (OFDM symbols) to be used for transmission of the PDCCH.

The physical HARQ indicator channel (PHICH) is used for transmission of a HARQ indicator (HARQ feedback, response information, or HARQ control information) indicating an ACKnowledgement (ACK) or a Negative ACKnowledgement (NACK) for the uplink data (Uplink Shared Channel (UL-SCH)) received by the base station apparatus 3.

The physical downlink control channel (PDCCH), the enhanced physical downlink control channel (EPDCCH), and/or the short physical downlink control channel (sPDCCH) is used to transmit Downlink Control Information (DCI). In the present embodiment, the PDCCH may include the EPDCCH. Furthermore, the PDCCH may include the sPDCCH.

Here, multiple DCI formats may be defined for the downlink control information transmitted on the PDCCH, the EPDCCH, and/or the sPDCCH. In other words, a field for the downlink control information may be defined in a DCI format, and may be mapped to information bits.

Here, the downlink DCI format is also referred to as downlink DCI, downlink grant (DL grant), and/or downlink assignment. The uplink DCI format is also referred to as uplink DCI, uplink grant (UL grant), and/or Uplink assignment.

For example, a DCI format including information regarding assignment of a frequency resource for at least the sPDSCH and/or the sPDCCH (e.g. information regarding assignment of a physical resource block for the sPDSCH, and/or the sPDCCH) (hereinafter also referred to as first DL grant, or first DL DCI) may be defined as downlink assignment. Specifically, the first DL grant may include information of assignment of a DLsTTI bandwidth (sTTI bandwidth). The frequency resource for the sTTI transmission and/or reception to be the assigned may be also referred to as an sTTI band. Specifically, the first DL grant may be used for scheduling of at least the sPDSCH and/or the sPDCCH. Here, the first DL grant may include a Carrier Indicator Field (CIF).

For example, the first DL grant may include information regarding the bandwidth for the scheduled sPDSCH and/or the scheduled sPDCCH. Specifically, the first DL grant may include information regarding the scheduled bandwidth for transmission on the sPDSCH and/or information regarding the scheduled bandwidth for transmission on the sPDCCH.

For example, the first DL grant may include information regarding the start position (and/or the end position; for example, the length from the start position) of the physical resource block for the scheduled sPDSCH and/or the scheduled sPDCCH. The first DL grant may include information for indicating the physical resource block for the scheduled sPDSCH and/or the scheduled sPDCCH.

Here, information (a part or all of the information) transmitted by using the first DL grant may be transmitted by using a signal of a higher layer (e.g. a signal in the MAC layer and/or a signal in the RRC layer). In the following description, information is transmitted by using the first DL grant; however, the information transmitted by using the first DL grant may be transmitted by using a signal of a higher layer.

Here, the first DL grant may be defined as DCI (DL grant, Common DL grant, Non-UE specific DL grant) common to multiple terminal apparatuses 1. Specifically, the first DL grant may be transmitted only in a common search space described later. The first DL grant may also be transmitted only on the PDCCH and/or the EPDCCH.

CRC parity bits added to the first DL grant may be scrambled with an RNTI described later. Here, CRC parity bits added to the first DL grant may be scrambled with a first DL-RNTI. The search space where the first DL grant is transmitted (e.g. a common search space) may be given by at least a first DL-RNTI.

The first DL grant may be used to define a configuration for a certain single subframe. Specifically, the first DL grant may be used to indicate a configuration shared in a certain single subframe. Specifically, the configuration indicated by using the first DL grant may be effective in a unit of one subframe or in a unit of multiple subframes. Specifically, the first DL grant may be a sub-frame specific DL grant.

As downlink assignment, a DCI format (hereinafter also referred to as a second DL grant, a second DL DCI) including information regarding time resource assignment for at least the PDSCH and/or the sPDSCH may be defined. For example, the second DL grant may include information regarding assignment of Transmission Time Interval (TTI) and/or information regarding assignment of short Transmission Time Interval (sTTI) for transmission on the PDSCH and/or the sPDSCH. Specifically, the second DL grant may be used for scheduling of at least the sPDSCH.

Note that, in a case that the second DL grant assigns a PDSCH, the PDSCH may be a PDSCH that is transmitted at a frequency different from that of the second DL grant.

For example, the second DL grant may include information regarding the length of the transmission time interval for the scheduled PDSCH and/or the scheduled sPDSCH. The second DL grant may include information regarding assignment of the frequency resource for the scheduled sPDSCH. The second DL grant may include information regarding the position of the DMRS that is transmitted together with the scheduled sPDSCH. The second DL grant may include information regarding the position of the DMRS that is transmitted together with the scheduled PDSCH.

The second DL grant may include information regarding the DMRS that is transmitted together with the scheduled PDSCH (e.g. information regarding the cyclic shift of the DMRS). The second DL grant may include information regarding the DMRS that is transmitted together with the scheduled sPDSCH (e.g. information regarding the cyclic shift of the DMRS).

The second DL grant may include information regarding the number of layers and Precoding for transmission on the PDSCH and/or transmission on the sPDSCH based on reception (detection) of the second DL grant. The second DL grant may include information regarding the MCS for the scheduled PDSCH and/or the scheduled sPDSCH. The second DL grant may include information regarding the redundancy version for the scheduled PDSCH and/or the scheduled sPDSCH. The second DL grant may include information regarding the transmission power control command of the sPUCCH for feedback of transmission on the scheduled PDSCH and/or the scheduled sPDSCH.

Here, the second DL grant may be defined as a DCI (DL grant, UE-specific DL grant) dedicated to a certain terminal apparatus 1. In other words, the second DL grant may be transmitted only in a UE specific space described later. The second DL grant may be transmitted on the PDCCH and/or the sPDCCH.

CRC parity bits added to the second DL grant may be scrambled with an RNTI described later. Here, CRC parity bits added to the second DL grant may be scrambled with a second DL-RNTI. A search space where the second DL grant is transmitted (e.g. a user-equipment-specific search space) may be given by at least a second DL-RNTI.

The second DL grant may be used to define a configuration for a certain transmission time interval. Specifically, the second DL grant may be used to indicate a configuration used in a certain transmission time interval. Specifically, the configuration indicated by using the second DL grant may be effective for one transmission time interval. In other words, the second DL grant may be a transmission-time interval specific DL grant (a TTI specific DL grant).

Here, as described above, the first DL grant may be used for scheduling of the sPDCCH on which the second DL grant is transmitted. For example, the terminal apparatus 1 may receive (detect) the second DL grant by receiving (detecting) the first DL grant. The terminal apparatus 1 may monitor (decode, detect) the PDCCH and/or the sPDCCH on which the second DL grant is transmitted by monitoring (decoding, detecting) the PDCCH and/or the EPDCCH on which the first DL grant is transmitted.

Here, the PDCCH and/or the EPDCCH on which the first DL grant is transmitted may be detected by monitoring with the terminal apparatus 1, and the PDCCH and/or the sPDCCH (the frequency resource of the PDCCH, the EPDCCH and/or the sPDCCH) on which the second DL grant is transmitted may be directly indicated (e.g. may be directly indicated by information included in the first DL grant). In other words, the PDCCH, the EPDCCH and/or the sPDCCH on which the second DL grant is transmitted may not be monitored by the terminal apparatus 1.

As downlink assignment, a DCI format (e.g. DCI format 1, DCI format 1A; hereafter, also referred to as third DL grant and third DL DCI) to be used for scheduling of one PDSCH in one cell may be defined. Here, the third DL grant is used for scheduling of the PDSCH within the same subframe as the subframe on which the downlink grant is transmitted.

Here, the first DL grant may include information regarding sTTI transmission within the same subframe as the subframe on which the downlink grant is transmitted, and/or within multiple different subframes.

For example, the third DL grant may include downlink control information such as Carrier Indicator Field (CIF), information regarding a transmission power command (TPC command) for feedback of the scheduled PDSCH (TPC command for scheduled PUCCH), information regarding the MCS and/or the redundancy version (Modulation and coding scheme and/or redundancy version), information regarding resource block assignment and/or hopping resource allocation (Resource block assignment and/or hopping resource allocation), and/or information regarding an SRS transmission request (SRS request).

Here, the third DL grant may be defined as DCI common to multiple terminal apparatuses 1 and/or DCI dedicated to a certain terminal apparatus 1. Specifically, the third DL grant may be transmitted in a common search space and/or a user-equipment-specific search space. The third DL grant may also be transmitted on the PDCCH and/or the EPDCCH. The CRC parity bits added to the third DL grant may be scrambled with an RNTI described later.

The third DL grant may be used to define a configuration for a certain single subframe. In other words, the third DL grant may be used to indicate a configuration shared in a certain single subframe. In other words, the configuration indicated by using the third DL grant may be effective in a unit of one subframe. In other words, the third DL grant may be a sub-frame specific DL grant.

In the following description, the downlink assignment may include the first DL grant, the second DL grant, and/or the third DL grant. The DCI format may include the first DL grant, the second DL grant, and/or the third DL grant.

As the uplink grant, DCI formats used for scheduling of one PUSCH in one cell (e.g. DCI format 0, and/or DCI format 4) may be defined.

As the uplink grant, random access response grant that is used for scheduling of the PUSCH in a random access procedure described later may be defined.

For example, the random access response grant may include information regarding assignment of a frequency resource for the PUSCH. For example, the random access response grant may include information regarding the bandwidth for the scheduled PUSCH. In other words, the random access response grant may include information regarding the scheduled bandwidth for transmission on the PUSCH.

For example, the random access response grant may include information regarding the start position (and/or, the end position; for example, the length from the start position) of the physical resource block for the scheduled PUSCH. The random access response grant may include information for indicating the physical resource block for the scheduled PUSCH.

The random access response grant may include information regarding a transmission power command for the scheduled PUSCH. The random access response grant may include information (UL delay) used to indicate whether to delay transmission on the PUSCH to a next usable uplink subframe. The random access response grant may include information regarding CSI transmission request.

Here, the random access response grant may be transmitted on the PDSCH. For example, the random access response grant may be transmitted on the PDSCH scheduled by using the DCI format to which CRC parity bits scrambled with an RA-RNTI described later are added (PDCCH with RA-RNTI).

The random access response grant may be used to define a configuration for a certain single subframe. In other words, the random access response grant may be used to indicate a configuration shared in a certain single subframe. In other words, the configuration indicated by using the random access response grant may be effective in a unit of one subframe. In other words, the random access response grant may be sub-frame specific UL grant.

In a case that a PDSCH resource is scheduled by using the downlink assignment, the terminal apparatus 1 may receive downlink data on the PDSCH, based on the scheduling. In a case that an sPDSCH resource is scheduled by using the downlink assignment, the terminal apparatus 1 may receive downlink data on the sPDSCH, based on the scheduling. In a case that the PUSCH resource is scheduled by using the uplink grant, the terminal apparatus 1 may transmit uplink data and/or uplink control information on the PUSCH, based on the scheduling. In a case that a sPUSCH resource is scheduled by using the uplink grant, the terminal apparatus 1 may transmit uplink data and/or uplink control information on the sPUSCH, based on the scheduling.

The terminal apparatus 1 may monitor a set of PDCCH candidates, EPDCCH candidates, and/or sPDCCH candidate. The PDCCH may include an EPDDCH and/or an sPDCCH below.

Here, the PDCCH candidates may indicate candidates which the PDCCH may be mapped and/or transmitted by the base station apparatus 3. Furthermore, "monitor" may imply that the terminal apparatus 1 attempts to decode each PDCCH in the set of PDCCH candidates in accordance with each of all the monitored DCI formats.

Here, the set of PDCCH candidates to be monitored by the terminal apparatus 1 is also referred to as a search space. The search space may include a Common Search Space (CSS). For example, the Common Search Space may be defined as a space common to multiple terminal apparatuses 1.

The search space may include a UE-specific Search Space (USS). For example, the UE-specific search space may be given at least based on C-RNTI assigned to the terminal apparatus 1. The terminal apparatus 1 may monitor the PDCCH in the common search space and/or the UE-specific search space to detect the PDCCH destined for the terminal apparatus 1 itself.

An RNTI assigned to the terminal apparatus 1 by the base station apparatus 3 may be used for the transmission of the downlink control information (transmission on the PDCCH). Specifically, Cyclic Redundancy check (CRC) parity bits may be attached to the DCI format (or downlink control information), and after the attaching, the CRC parity bits may be scrambled with the RNTI. Here, the CRC parity bits attached to the DCI format may be obtained from a payload of the DCI format.

Here, in the present embodiment, "CRC parity bits" "CRC bit" and "CRC" may be identical. Furthermore, "PDCCH on which a DCI format with CRC parity bits being added is transmitted", "PDCCH including CRC parity bits and a DCI format", "PDCCH including CRC parity bits", and "PDCCH including a DCI format" may be identical. Furthermore, "PDCCH including X", and, "PDCCH with X" may be identical. The terminal apparatus 1 may monitor the DCI format. The terminal apparatus 1 may monitor the DCI. The terminal apparatus 1 may monitor the PDCCH.

The terminal apparatus 1 attempts to decode the DCI format to which the CRC parity bits scrambled with the RNTI are attached, and detects, as a DCI format destined for the terminal apparatus 1 itself, the DCI format for which the CRC has been successful (also referred to as blind coding). In other words, the terminal apparatus 1 may detect the PDCCH with the CRC scrambled with the RNTI. The terminal apparatus 1 may detect the PDCCH including the DCI format to which the CRC parity bits scrambled with the RNTI are attached.

Here, the RNTI may include a Cell-Radio Network Temporary Identifier (C-RNTI). For example, the C-RNTI may be an identifier unique to the terminal apparatus 1 and used for the identification in RRC connection and scheduling. The C-RNTI may be used for dynamically scheduled unicast transmission.

The RNTI may further include a Semi-Persistent Scheduling C-RNTI (SPS C-RNTI). For example, the SPS C-RNTI is an identifier unique to the terminal apparatus 1 and used for semi-persistent scheduling. The SPS C-RNTI may be used for semi-persistently scheduled unicast transmission. Here, the semi-persistently scheduled transmission may include meaning of periodically scheduled transmission.

The RNTI may include a Random Access RNTI (RA-RNTI). For example, the RA-RNTI may be an identifier used for transmission of a random access response message. Specifically, the RA-RNTI may be used for the transmission of the random access response message in a random access procedure. For example, the terminal apparatus 1 may monitor the PDCCH with the CRC scrambled with the RA-RNTI in a case that a random access preamble is transmitted. The terminal apparatus 1 may receive a random access response on the PDSCH in accordance with detection of the PDCCH with the CRC scrambled with the RA-RNTI.

RNTI may include a Temporary C-RNTI. For example, the Temporary C-RNTI may be an identifier unique to the preamble transmitted by the terminal apparatus 1 and used during a contention-based random access procedure. The Temporary C-RNTI may be used for dynamically scheduled transmission.

The RNTI may further include a Paging RNTI (P-RNTI). For example, the P-RNTI may be an identifier used for paging and notification of system information modification. For example, the P-RNTI may be used for paging and transmission of a system information message. For example, the terminal apparatus 1 may receive paging on the PDSCH in accordance with detection of the PDCCH with the CRC scrambled with the P-RNTI.

The RNTI may further include a System Information RNTI (SI-RNTI). For example, the SI-RNTI may be an identifier used for broadcast of the system information. For example, the SI-RNTI may be used for transmission of the system information message. For example, the terminal apparatus 1 may receive the system information message on the PDSCH in accordance with detection of the PDCCH with the CRC scrambled with the SI-RNTI.

Here, the PDCCH with the CRC scrambled with the C-RNTI may be transmitted in the USS or CSS. The PDCCH with the CRC scrambled with the RA-RNTI may be transmitted only in the CSS. The PDCCH with the CRC scrambled with the P-RNTI may be transmitted only in the CSS. The PDCCH with the CRC scrambled with the SI-RNTI may be transmitted only in the CSS. The PDCCH with the CRC scrambled with the Temporary C-RNTI may be transmitted only in the CSS.

The PDSCH and/or the sPDSCH is used to transmit downlink data (Downlink Shared Channel (DL-SCH)). The PDSCH may be used to transmit the random access response grant. Here, the random access response grant is used for scheduling of the PUSCH in the random access procedure. The random access response grant is indicated to a physical layer by a higher layer (e.g. the MAC layer).

The PDSCH is used to transmit a system information message. Here, the system information message may be cell-specific information (information unique to a cell). The system information may be included in the RRC signaling. The PDSCH may be used to transmit the RRC signaling and the MAC control element.

The PMCH is used to transmit multicast data (Multicast Channel (MCH)).

In FIG. 1, the following downlink physical signals are used for downlink radio communication. Here, the downlink physical signals are not used to transmit the information output from the higher layers but is used by the physical layer.

Synchronization signal (SS)
  Downlink Reference Signal (DLRS)

The synchronization signal is used for the terminal apparatus 1 to be synchronized to frequency and time domains in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The Downlink Reference Signal is used for the terminal apparatus 1 to perform channel compensation on a downlink physical channel. The downlink reference signal is used in order for the terminal apparatus 1 to obtain the downlink channel state information.

According to the present embodiment, the following five types of downlink reference signals are used.

Cell-specific Reference Signal (CRS)
  UE-specific Reference Signal (URS) relating to the PDSCH and/or the sPDSCH
  Demodulation Reference Signal (DMRS) relating to the PDCCH, the EPDCCH and/or the sPDCCH
  Non-Zero Power Chanel State Information-Reference Signal (NZP CSI-RS)
  Zero Power Chanel State Information-Reference Signal (ZP CSI-RS)
  Multimedia Broadcast and Multicast Service over Single Frequency Network Reference signal (MBSFN RS)
  Positioning Reference Signal (PRS)

Here, the URS for demodulating the PDSCH and/or the sPDSCH may be also referred to as a DMRS. Specifically, the DMRS for demodulation to the PDSCH and/or the sPDSCH may be identical to the DMRS relating to PDCCH, the EPDCCH and/or the sPDCCH. The DMRS for demodulation to the PDSCH and/or the sPDSCH may differ from the DMRS relating to the PDCCH, the EPDCCH and/or the sPDCCH.

Here, the downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, the MCH, the UL-SCH and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and coding processing is performed for each codeword.

Figure 2:
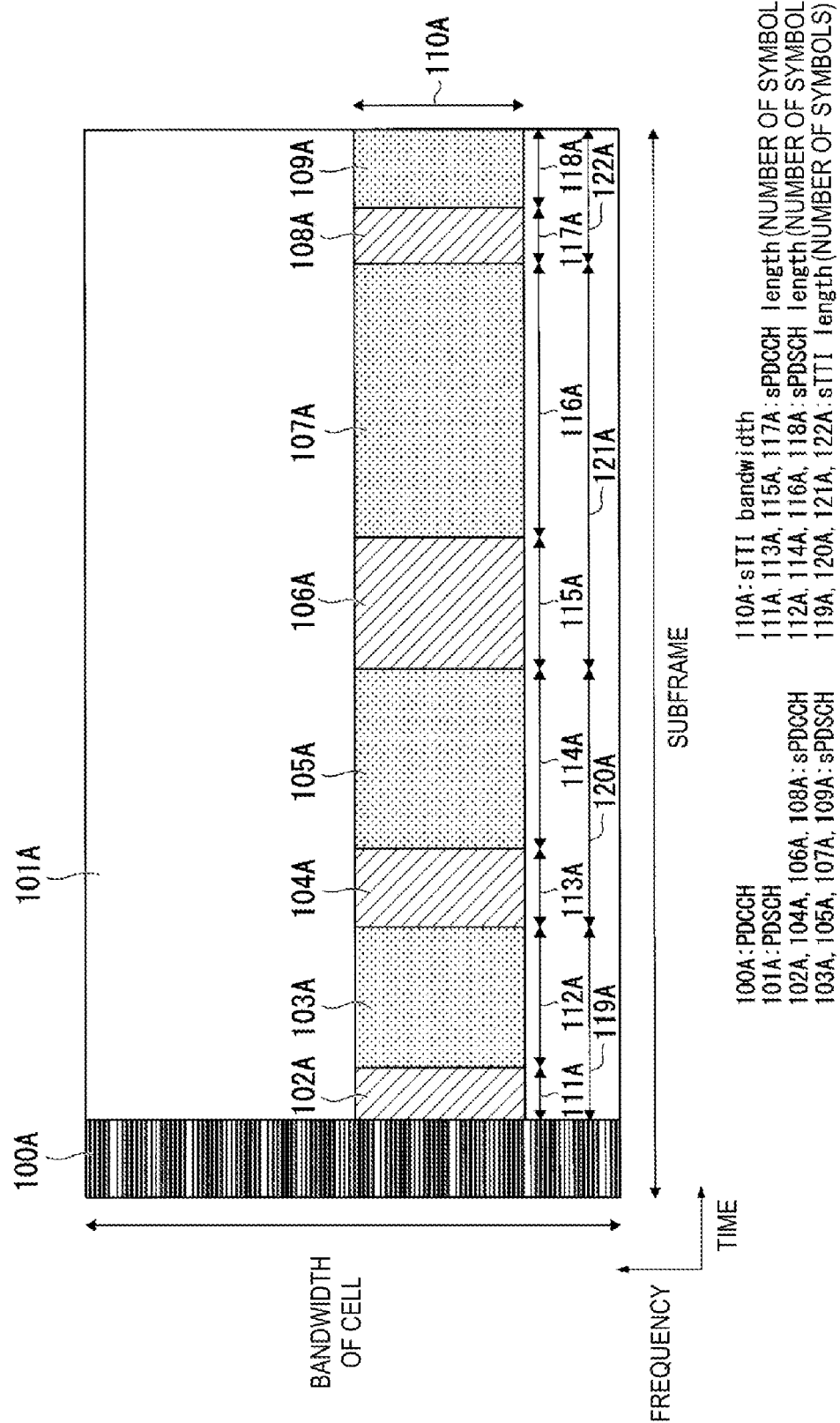
FIG. 2 is a schematic diagram illustrating an example of a downlink data transmission method according to the first embodiment of the present invention.

FIG. 2 is a schematic diagram illustrating an example of a downlink data transmission method according to the first embodiment of the present invention.

One subframe includes two successive slots (1st slot and 2nd slot). One slot includes seven OFDM symbols (downlink), or seven SC-FDMA symbols (uplink).

The illustrated example may illustrate a method of transmitting downlink data, and the base station apparatus 3 may perform, on the terminal apparatus 1, transmission on a PDCCH 100A and transmission on a PDSCH 101A in a prescribed time and at a frequency of a prescribed cell and a frequency bandwidth of a prescribed cell in one subframe. The base station apparatus 3 may perform transmission on one or more sPDCCHs and transmission on one or more sPDSCHs in a part or all of a prescribed time at a frequency bandwidth of a prescribed cell and a frequency of a prescribed cell transmitted on the PDSCH 101A.

Here, one subframe may be transmitted by using a prescribed transmission time interval (TTI). In the following description, the transmission mode using the TTI is also referred to as a transmission mode (TTI mode) for the PDSCH.

The base station apparatus 3 may perform, by using a prescribed short transmission time interval (sTTI), transmission on one sPDCCH and transmission on one sPDSCH in a part or all of a prescribed time at a frequency bandwidth of a prescribed cell and a frequency of a prescribed cell for transmission on the PDSCH. In the following description, the transmission mode using the sTTI is also referred to as a transmission mode for the SPDSCH (sTTI mode).

Note that, in the base station apparatus 3, transmission on the sPDCCH may be performed by using the sTTI, and transmission on the sPDSCH may be performed by using sTTI. Here, the lengths of the TTI and the sTTI are referred to as a TTI length and an sTTI length, respectively. Each of the TTI length and the sTTI length may be defined by the number of the symbols, or by the time length.

For example, in an sTTI length 119A, the base station apparatus 3 may transmit an sPDCCH 102A of an sPDCCH length 111A, and transmit an sPDSCH 103A of an sPDSCH length 112A. In an sTTI length 120A, the base station apparatus 3 may transmit an sPDCCH 104A of an sPDCCH length 113A, and transmit an sPDSCH 105A of an sPDSCH length 114A, for example.

In an sTTI length 121A, the base station apparatus 3 may transmit an sPDCCH 106A of an sPDCCH length 115A, and may transmit an sPDSCH 107A of an sPDSCH length 116A, for example.

In an sTTI length 122A, the base station apparatus 3 may transmit an sPDCCH 108A of an sPDCCH length 117A, and may transmit an sPDSCH 109A of an sPDSCH length 118A, for example.

Here, the sPDCCHs 102A, 104A, 106A and 108A may have the same sPDCCH length, or different sPDCCH lengths. The sPDSCHs 103A, 105A, 107A and 109A may have the same sPDSCH length, or different sPDSCH lengths. The sTTI lengths 119A, 120A, 121A and 122A may have the same sTTI length, or different sTTI lengths.

The sPDCCHs 102A, 104A, 106A, and 108A, and the sPDSCHs 103A, 105A, 107A, and 109A transmitted by using sTTI lengths 119A, 120A, 121A and 122A may use the same frequency bandwidth (the sTTI bandwidth 110A), or use different frequency bandwidths (the sTTI bandwidths) in the sTTI lengths 119A, 120A, 121A and 122A.

The base station apparatus 3 may transmit downlink control information including information regarding the sPDCCH such as frequency assignment information, carrier aggregation level, and the like of the sPDCCH and sPDSCH for the sPDCCHs 102A, 104A, 106A, and 108A and/or the sPDSCHs 103A, 105A, 107A, and 109A in transmission on the PDSCH 101A, in PDCCH 100A.

For example, the base station apparatus 3 may transmit the first DL grant in the PDCCH. Here, the base station apparatus 3 may configure the subframe and/or the symbol (OFDM symbol) for monitoring of the first DL grant by the terminal apparatus 1. For example, the base station apparatus 3 may transmit, by using a signal of a higher layer, information used to configure the subframe and/or the symbols (OFDM symbol) for monitoring of the first DL grant by the terminal apparatus 1.

Here, the first DL grant may be effective for the subframe in which the first DL grant is received. For example, the received first DL grant may be used to indicate the bandwidth (frequency resource) for the sPDSCH and/or the sPDCCH used in the subframe.

The base station apparatus 3 may transmit the second DL grant, for example. Here, the second DL grant may be transmitted on the sPDCCH. For example, the sPDSCH in the sTTI may be scheduled by using the second DL grant.

In other words, transmission on the sPDSCH may be scheduled by using the second DL grant. In other words, the terminal apparatus 1 may perform reception on the sPDSCH in accordance with the scheduling by the base station apparatus 3.

Likewise, the base station apparatus 3 may schedule transmission on the PDSCH by using the third DL grant, and the terminal apparatus 1 may perform reception on the PDSCH in accordance with the scheduling by the base station apparatus 3.

Figure 11:
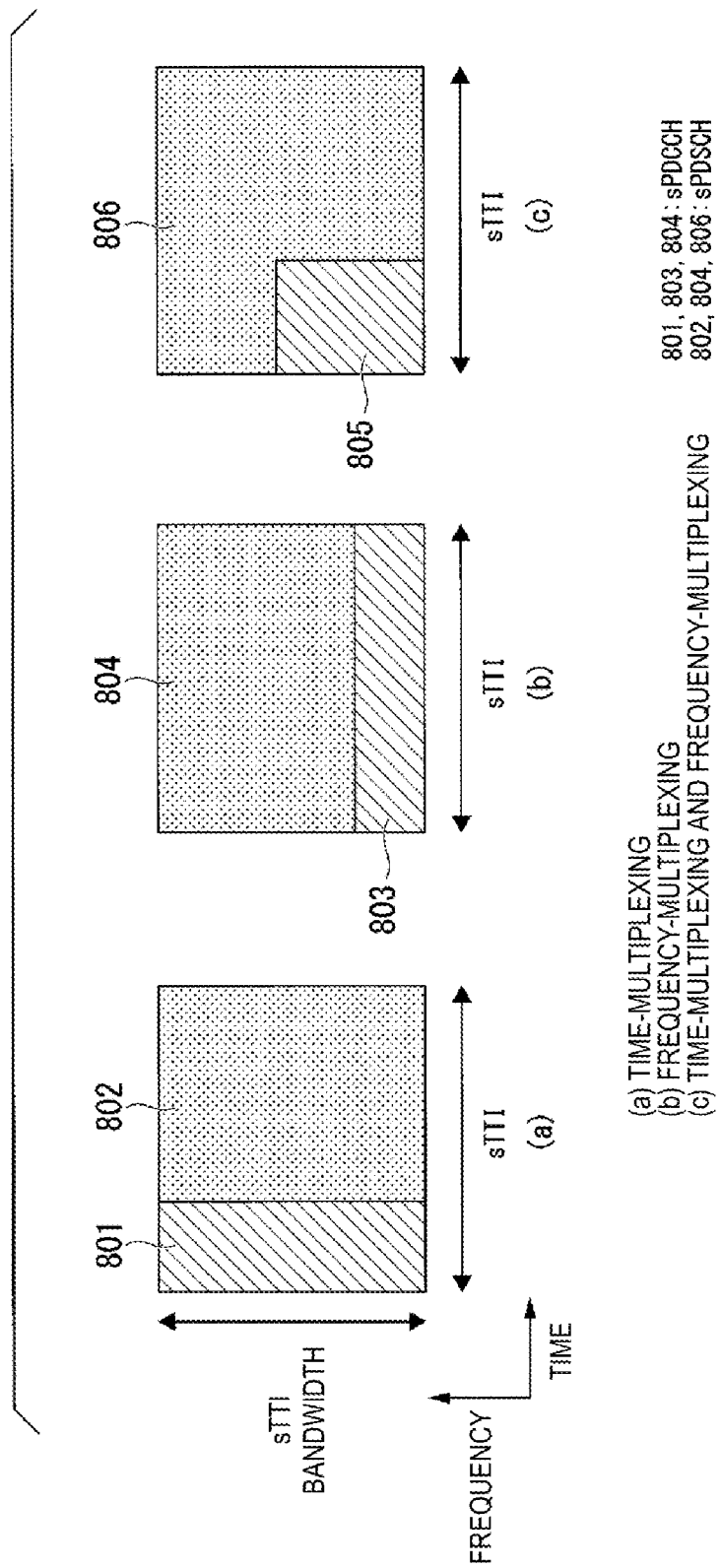
FIGS. 11A to 11C are schematic diagrams illustrating examples of multiplexing of an sPDCCH and an sPDSCH in an sTTI according to the first embodiment of the present invention.

Note that the example illustrated in FIG. 2 illustrates a case in which the sPDCCH and the sPDSCH are time-multiplexed in the sTTI band, whereas the sPDCCH and the sPDSCH may be time-multiplexed as illustrated in FIG. 11A. Alternatively, it is also possible to perform frequency-multiplexing as illustrated in FIG. 11B. Alternatively, it is also possible to perform both time-multiplexing and frequency-multiplexing as illustrated in FIG. 11C.

Figure 3:
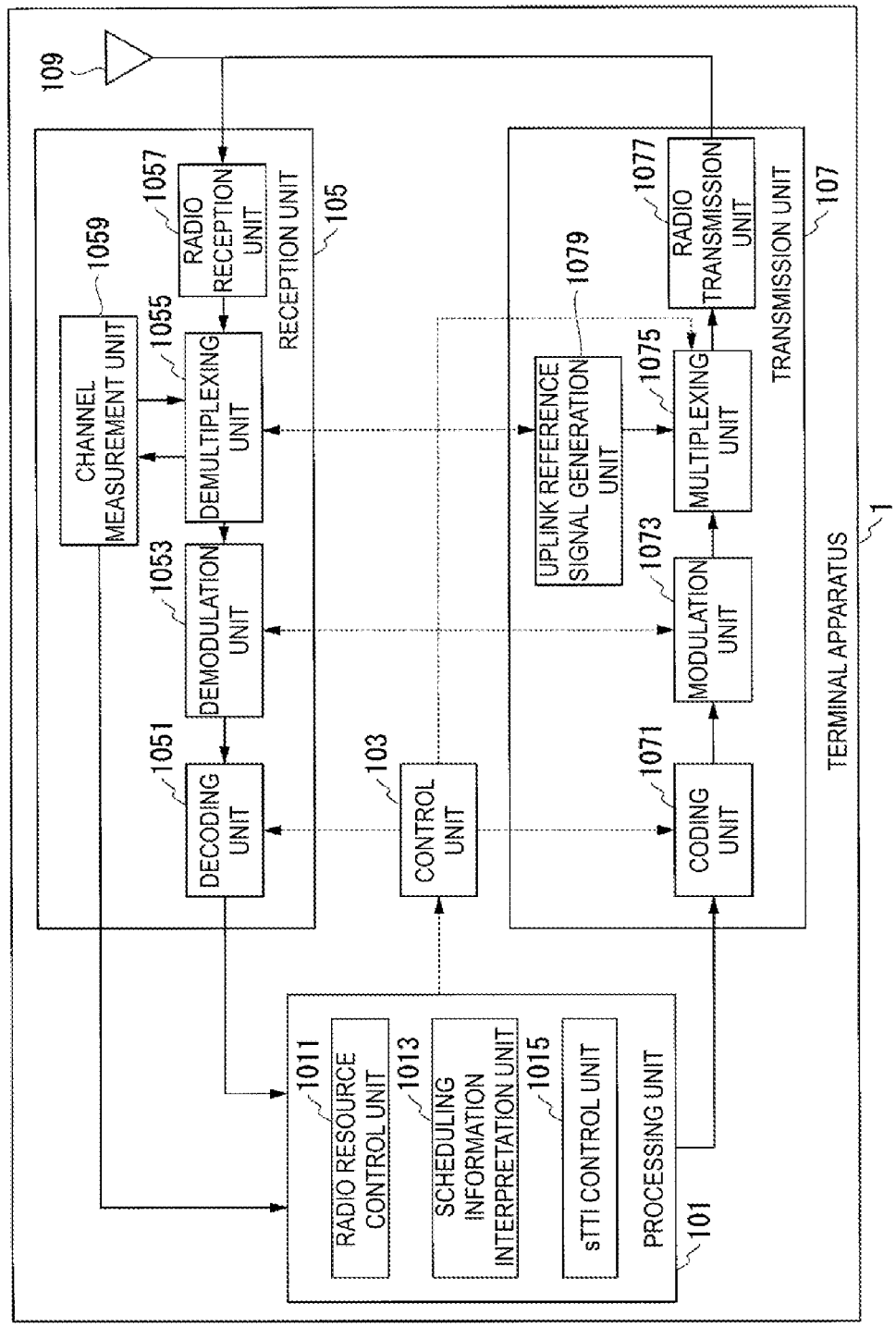
FIG. 3 is a block diagram schematically illustrating an example of a configuration of a terminal apparatus according to the first embodiment of the present invention.

FIG. 3 is a block diagram schematically illustrating an example of a configuration of the terminal apparatus 1 according to the first embodiment of the present invention.

The terminal apparatus 1 includes a processing unit 101, a control unit 103, a reception unit 105, a transmission unit 107, and a transmit and receive antenna 109. The processing unit 101 includes a radio resource control unit 1011, a scheduling information interpretation unit 1013, and an sTTI control unit 1015. The reception unit 105 includes a decoding unit 1051, a demodulation unit 1053, a demultiplexing unit 1055, a radio reception unit 1057, and a channel measurement unit 1059. The transmission unit 107 includes a coding unit 1071, a modulating unit 1073, a multiplexing unit 1075, a radio transmission unit 1077, and an uplink reference signal generation unit 1079.

The processing unit 101 outputs the uplink data (the transport block) generated by a user operation or the like, to the transmission unit 107. The processing unit 101 performs processing of the Medium Access control (MAC), the Packet Data Convergence Protocol (PDCP) layer, the Radio Link Control (RLC) layer, the Radio Resource Control (RRC) layer, and the like.

The radio resource control unit 1011 included in the processing unit 101 manages various configuration information/parameters of the subject apparatus. The radio resource control unit 1011 sets the various configuration information/parameters in accordance with higher layer signaling received from the base station apparatus 3. To be more specific, the radio resource control unit 1011 sets the various configuration information/parameters in accordance with the information indicating the various configuration information/parameters received from the base station apparatus 3. Furthermore, the radio resource control unit 1011 generates information to be mapped to each uplink channel, and outputs the generated information to the transmission unit 107. The radio resource control unit 1011 is also referred to as a configuration unit 1011.

Here, the scheduling information interpretation unit 1013 included in the processing unit 101 interprets (analyzes) the DCI format (scheduling information, and UL grant) received through the reception unit 105, generates control information for control of the reception unit 105 and the transmission unit 107, in accordance with a result of interpretation of the DCI format (an analysis result), and outputs the generated control information to the control unit 103.

The sTTI control unit 1015 included in the processing unit 101 performs a control related to TTI transmission/reception and a control related to sTTI transmission/reception in accordance with various configuration information, and information or conditions related to the SPS such as parameters.

In accordance with the control information from the processing unit 101, the control unit 103 generates a control signal for performing control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station apparatus 3 through the transmit and receive antenna 109, and outputs information resulting from the decoding to the processing unit 101.

The radio reception unit 1057 converts (down-converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation, based on an in-phase component and an orthogonal component of the received signal, and converts the resulting orthogonally-demodulated analog signal into a digital signal. The radio reception unit 1057 removes a portion corresponding to a Cyclic Prefix (CP) from the digital signal resulting from the conversion, performs Fast Fourier Transform (FFT) on the signal from which the CP has been removed, and extracts a signal in the frequency domain.

The demultiplexing unit 1055 demultiplexes the extracted signal into the PHICH, the PDCCH, the sPDCCH, the PDSCH, the sPDSCH, and the downlink reference signal. Moreover, the demultiplexing unit 1055 makes a compensation of channels including the PHICH, the PDCCH, the sPDCCH, the PDSCH, and the sPDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal apparatus 1 itself and outputs the HARQ indicator resulting from the decoding to the processing unit 101. The demodulation unit 1053 demodulates the PDCCH and/or the sPDCCH in compliance with a QPSK modulation scheme and outputs a result of the demodulation to the decoding unit 1051. The decoding unit 1051 attempts to decode the PDCCH and/or the sPDCCH. In a case of succeeding in the decoding, the decoding unit 1051 outputs downlink control information resulting from the decoding and an RNTI to which the downlink control information corresponds, to the processing unit 101.

The demodulation unit 1053 demodulates the PDSCH and/or the sPDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information of a coding rate notified with the downlink control information, and outputs, to the processing unit 101, the decoded downlink data (the transport block).

The channel measurement unit 1059 measures a downlink path loss or a channel state from the downlink reference signal input from the demultiplexing unit 1055, and outputs the measured path loss or channel state to the processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmission unit 107 generates the uplink reference signal in accordance with the control signal input from the control unit 103, codes and modulates the uplink data (the transport block) input from the processing unit 101, multiplexes the PUCCH, the PUSCH, and the generated uplink reference signal, and transmits a result of the multiplexing to the base station apparatus 3 through the transmit and/or receive antenna 109. Furthermore, the transmission unit 107 transmits uplink control information.

The coding unit 1071 performs coding, such as convolutional coding or block coding, on the uplink control information input from the processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme predetermined in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs precoding on the sequences.

The uplink reference signal generation unit 1079 generates a sequence acquired in accordance with a rule (formula) predetermined in advance, based on a physical layer cell identity (also referred to as a PCI, a Cell ID, or the like) for identifying the base station apparatus 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 109 for transmission.

Figure 4:
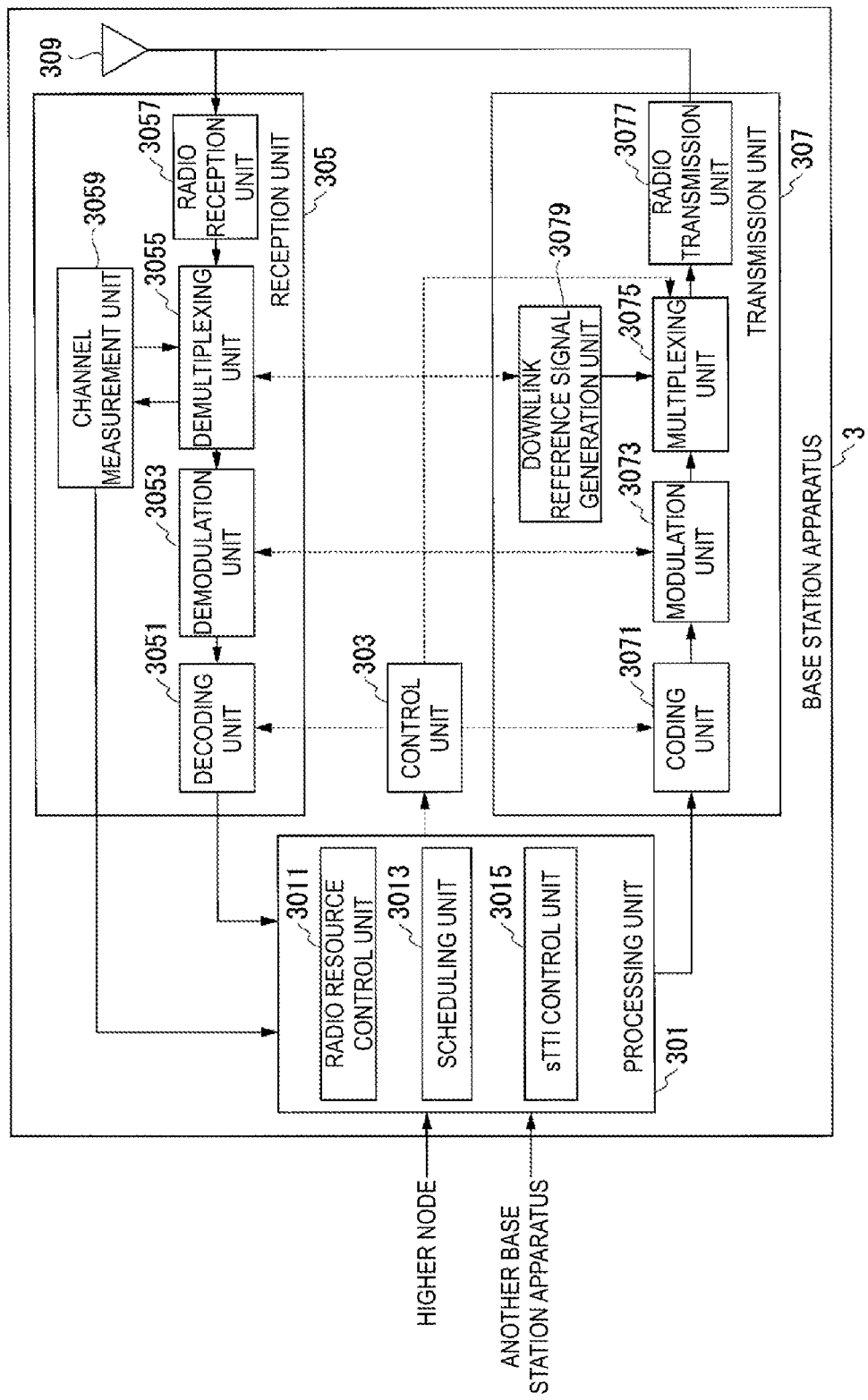
FIG. 4 is a block diagram schematically illustrating an example of a configuration of a base station apparatus according to the first embodiment of the present invention.

FIG. 4 is a block diagram schematically illustrating an example of a configuration of the base station apparatus according to the first embodiment of the present invention.

The base station apparatus 3 includes a processing unit 301, a control unit 303, a reception unit 305, a transmission unit 307, and a transmit and receive antenna 309. The processing unit 301 includes a radio resource control unit 3011, a scheduling unit 3013, and an sTTI control unit 3015. The reception unit 305 includes a decoding unit 3051, a demodulation unit 3053, a demultiplexing unit 3055, a radio reception unit 3057, and a channel measurement unit 3059. The transmission unit 307 includes a coding unit 3071, a modulating unit 3073, a multiplexing unit 3075, a radio transmission unit 3077, and a downlink reference signal generation unit 3079.

The processing unit 301 performs processing of the Medium Access control (MAC) layer, the Packet Data Convergence Protocol (PDCP) layer, the Radio Link Control (RLC) layer, the Radio Resource Control (RRC) layer, and the like. The processing unit 301 generates control information for control of the reception unit 305 and the transmission unit 307, and outputs the generated control information to the control unit 303.

The radio resource control unit 3011 included in the processing unit 301 generates, or acquires from a higher node, the downlink data (the transport block) mapped to the downlink PDSCH, system information, the RRC message, the MAC control Element (CE), and the like, and outputs a result of the generation or the acquirement to the transmission unit 307. Furthermore, the radio resource control unit 3011 manages various configuration information/parameters for each of the terminal apparatuses 1. The radio resource control unit 3011 may configure various configuration information/parameters for each of the terminal apparatuses 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the processing unit 301 determines a frequency and a subframe to which the physical channels (PDSCH, sPDSCH, and PUSCH) are allocated, the coding rate and modulation scheme for the physical channels (PDSCH, sPDSCH, and PUSCH), the transmit power, and the like, from the received channel state information and from the channel estimate, channel quality, or the like input from the channel measurement unit 3059. The scheduling unit 3013 generates the control information (e.g., the DCI format) in order to control the reception unit 305 and the transmission unit 307 in accordance with a result of the scheduling, and outputs the generated information to the control unit 303. The scheduling unit 3013 further determines the timing of performing transmission processing and reception processing.

The sTTI control unit 3015 included in the processing unit 301 performs controls concerning the SPS, based on various configuration information, and information or conditions regarding the SPS such as parameters.

In accordance with the control information originating from the processing unit 301, the control unit 303 generates a control signal for control of the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal apparatus 1 through the transmit and receive antenna 309, and outputs information resulting from the decoding to the processing unit 301. The radio reception unit 3057 converts (down-converts) an uplink signal received through the transmit and receive antenna 309 into a baseband signal through orthogonal demodulation, removes unnecessary frequency components, controls the amplification level in such a manner as to suitably maintain a signal level, performs orthogonal demodulation, based on an in-phase component and an orthogonal component of the received signal, and converts the resulting orthogonally-demodulated analog signal into a digital signal. The reception unit 305 receives the uplink control information.

The radio reception unit 3057 removes a portion corresponding to a Cyclic Prefix (CP) from the digital signal resulting from the conversion. The radio reception unit 3057 performs Fast Fourier Transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme predetermined in advance, such as Binary Phase Shift Keying (BPSK), QPSK, 16 QAM, or 64 QAM, or in compliance with the modulation scheme that the base station apparatus 3 itself notified in advance with the uplink grant each of the terminal apparatuses 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal apparatuses 1 and information designating the precoding to be performed on the sequences.

The decoding unit 3051 decodes the coded bits of the PUCCH and the PUSCH, which have been demodulated, at the coding rate in compliance with a coding scheme predetermined in advance, the coding rate being predetermined in advance or being notified in advance with the uplink grant to the terminal apparatus 1 by the base station apparatus 3 itself, and outputs the decoded uplink data and uplink control information to the processing unit 101. In a case where the PUSCH is re-transmitted, the decoding unit 3051 performs the decoding with the coded bits input from the processing unit 301 and retained in an HARQ buffer, and the demodulated coded bits. The channel measurement unit 3059 measures the channel estimate, the channel quality, and the like, based on the uplink reference signal input from the demultiplexing unit 3055, and outputs a result of the measurement to the demultiplexing unit 3055 and the processing unit 301.

The transmission unit 307 generates the downlink reference signal in accordance with the control signal input from the control unit 303, codes and modulates the HARQ indicator, the downlink control information, and the downlink data that are input from the processing unit 301, multiplexes the PHICH, the PDCCH, the sPDCCH, the PDSCH, the sPDSCH, and the downlink reference signal, and transmits a result of the multiplexing to the terminal apparatus 1 through the transmit and receive antenna 309.

The coding unit 3071 codes the HARQ indicator, downlink control information, and the downlink data that are input from the processing unit 301, in compliance with the coding scheme predetermined in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme predetermined in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal apparatus 1 and that is acquired in accordance with a rule predetermined in advance, based on the Physical layer Cell Identifier (PCI) for identifying the base station apparatus 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmission unit 3077 performs Inverse Fast Fourier Transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 309 for transmission.

More specifically, the terminal apparatus 1 of the present embodiment includes the reception unit 105 configured to receive sTTI pattern (such as the sTTI length, the sPDCCH length, and the sPDSCH length) information indicating the length of the sTTI, and a decoding unit (the decoding unit 1051) configured to decode the short physical downlink control channel (sPDCCH) in accordance with the transmission scheme for the short physical downlink control channel (sPDCCH) and decode the short physical downlink shared channel (sPDSCH) in accordance with the transmission scheme for the short physical downlink shared channel (sPDSCH). The transmission scheme for the short physical downlink control channel (sPDCCH) and the transmission scheme for the short physical downlink shared channel (sPDSCH) are given based on sTTI pattern (such as the sTTI length, the sPDCCH length, and the sPDSCH length) information.

Here, the terminal apparatus 1 may determine the transmission scheme for the short physical downlink control channel (sPDCCH) according to the length (sPDCCH length) of the short physical downlink control channel (sPDCCH).

The length (sPDCCH length) of the short physical downlink control channel (sPDCCH) may be determined based on the sTTI bandwidth (sTTI bandwidth).

The base station apparatus 3 of the present embodiment includes the transmission unit 307 configured to transmit sTTI pattern information indicating the length of the sTTI, and the transmission unit 307 transmits the sTTI pattern information including the transmission scheme for the short physical downlink control channel (sPDCCH) and the transmission scheme for the short physical downlink shared channel (sPDSCH) for causing the terminal apparatus 1 to decode the short physical downlink control channel (sPDCCH) in accordance with the transmission scheme for the short physical downlink control channel (sPDCCH), and for causing the terminal apparatus 1 to decode the short physical downlink shared channel (sPDSCH) in accordance with the transmission scheme for the short physical downlink shared channel (sPDSCH).

Here, the base station apparatus 3 may determine the transmission scheme for the short physical downlink control channel (sPDCCH) according to the length (sPDCCH length) of the short physical downlink control channel (sPDCCH).

The length (sPDCCH length) of the short physical downlink control channel (sPDCCH) may be determined based on the sTTI bandwidth (sTTI bandwidth).

This allows the terminal apparatus 1 to efficiently receive downlink data. For example, the terminal apparatus 1 can achieve coexistence with a terminal apparatus corresponding to a previous release. As a result, the downlink resources can be efficiently used, and downlink data can be efficiently received.

Figure 5:
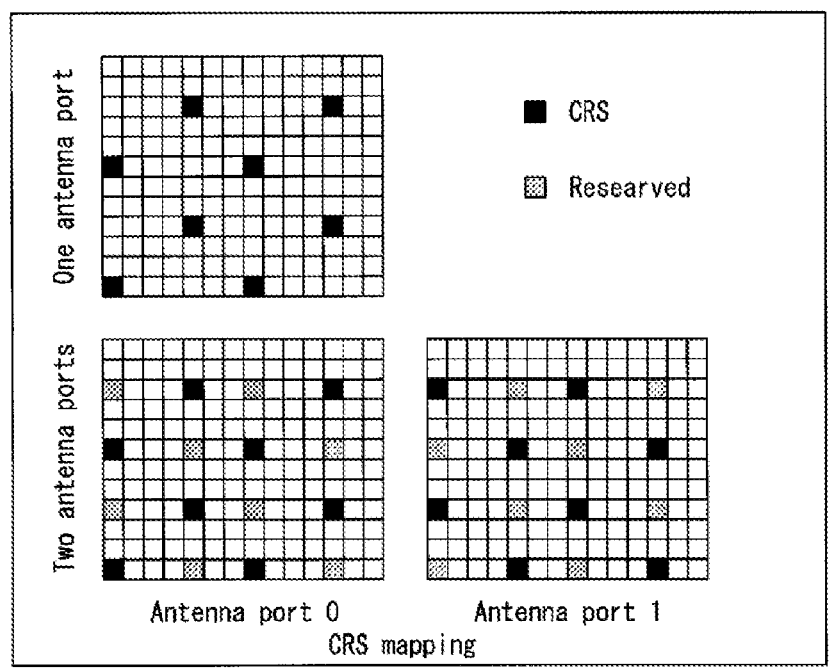
FIG. 5 is a schematic diagram illustrating an example of a signal mapped by the base station apparatus according to the first embodiment of the present invention.

FIG. 5 is a schematic diagram illustrating an example of a signal mapped by the base station apparatus 3 according to the first embodiment of the present invention.

The example in the drawing illustrates two Resource Block (RB) pairs in one subframe. One resource block includes 12 subcarriers in the frequency direction and seven OFDM symbols in the time direction. In one OFDM symbol, each subcarrier is referred to as a Resource Element (RE). In each subframe, each of the seven OFDM symbols in the time direction are referred to a slot, and two successive resource blocks included in one subframe are referred to as a resource block pair.

Here, the number of the resource block can be changed depending on the frequency bandwidth (system bandwidth) used by the communication system. For example, 6 to 110 resource blocks may be used, and are also referred to as a Component Carrier (CC; Carrier Component) as one unit. The entire system bandwidth may be set to 110 or more by carrier aggregation.

For example, the CRSs are mapped to the resource elements indicated with black in FIG. 5. The illustrated examples include an example for one antenna port and an example for two antenna ports. The number of antenna ports may be changed, and for example, it is possible to map the CRSs for four antenna ports. While the illustrated example uses antenna port 0 and antenna port 1, the CRS may be configured to four antenna ports (antenna ports 0 to 3) at maximum.

Note that data signals and/or control signals are mapped to the resource elements indicated with white in FIG. 5. Note that the CSI-RS, the DMRS, and the like may also be mapped.

Figure 6:
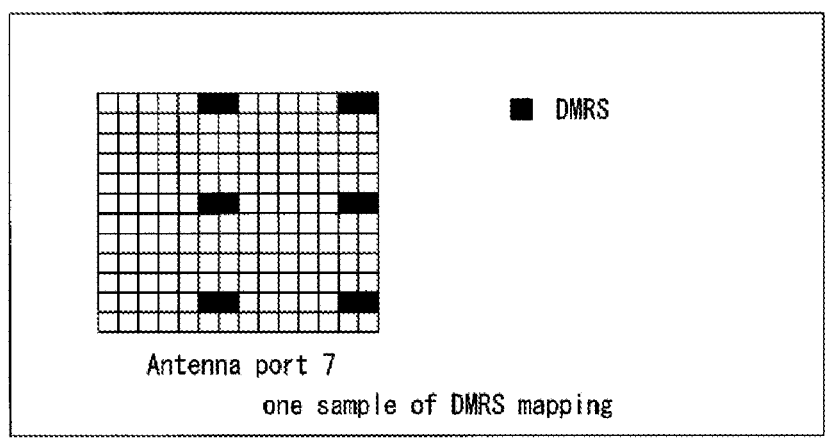
FIG. 6 is a schematic diagram illustrating another example of a signal mapped by the base station apparatus according to the first embodiment of the present invention.

FIG. 6 is a schematic diagram illustrating another example of a signal mapped by the base station apparatus 3 according to the first embodiment of the present invention.

For example, the DMRSs are mapped to the resource elements indicated with hatching in FIG. 6. The DMRSs are mapped such that the resource element differs according to the unit of Code Division Multiplexing (CDM). Data signals and/or control signals are mapped to resource elements indicated with white in FIG. 6. Note that the CSI-RS, the CRS, and the like may also be mapped.

The antenna port is defined to 7 to 14. The antenna port differs depending on the number of layers, and the maximum number of layers is eight. Specifically, in a case that the number of layers is eight, antenna ports 7 to 14 are used. In a case that the number of layers is smaller than eight, some of antenna ports 7 to 14 are used. For example, in a case that the number of layers is four, antenna ports 7 to 10 are used, and in a case that the number of layers is one, antenna port 7 or 8 is used. In the illustrated example, the antenna port number is 7.

FIG. 7 is a diagram illustrating an example of an sTTI length determination table according to the first embodiment of the present invention.

The base station apparatus 3 configures the sTTI pattern of each subframe to the terminal apparatus 1 by using sTTI pattern information.

The sTTI pattern information may be included in the first DL grant (non-UE specific DCI and/or subframe specific DCI) transmitted on the PDCCH. The sTTI pattern information may include at least one of information indicating the sTTI length, information indicating the sPDCCH length, information indicating the sPDSCH length, or information indicating the sTTI bandwidth, for example. The first DL grant transmitted on the PDCCH may include frequency assignment information of the sPDCCH and/or the sPDSCH, information regarding the sPDCCH such as the aggregation level, and identification information such as the C-RNTI.

The sTTI pattern information may include information indicating the sPDCCH resource (sPDCCH candidate) monitored (decoded) by the terminal apparatus 1 (the reception unit 105 (the decoding unit 1051)). The sTTI pattern information may include information indicating the sPDCCH and/or sPDSCH resource. Information indicating the sPDCCH and/or sPDSCH resource may be indicated by the number of the symbols and the symbol start position, or may be indicated by the symbol index of the sPDCCH.

Note that the sPDCCH resource may be defined by the number of symbols and/or the sPDCCH bandwidth. Here, the sPDCCH bandwidth may be expressed by the number of the physical resource blocks.

FIGS. 11A to 11C are schematic diagrams illustrating examples of multiplexing of an sPDCCH and an sPDSCH in an sTTI according to the first embodiment of the present invention.

For example, in the case of FIG. 11A, the length of the sPDCCH (sPDCCH length) may be determined based on the sTTI bandwidth (sTTI bandwidth).

For example, in the case of FIG. 11B and/or FIG. 11C, the sPDCCH bandwidth may be determined according to the length of the sTTI length.

For example, in the case of FIG. 11B and/or FIG. 11C, the sPDCCH bandwidth may be determined according to the length of the sPDCCH length.

For example, the sPDCCH bandwidth may be determined based on multiple parameters configured by the base station apparatus according to the length of sTTI and/or sPDCCH. As an example, in a case that the length of the sTTI and/or the sPDCCH is two symbols, the sPDCCH bandwidth may be determined by the first parameter, and in addition, in a case that the length of the sTTI and/or the sPDCCH is seven symbols, the sPDCCH bandwidth may be determined by the second parameter.

Figure 12:
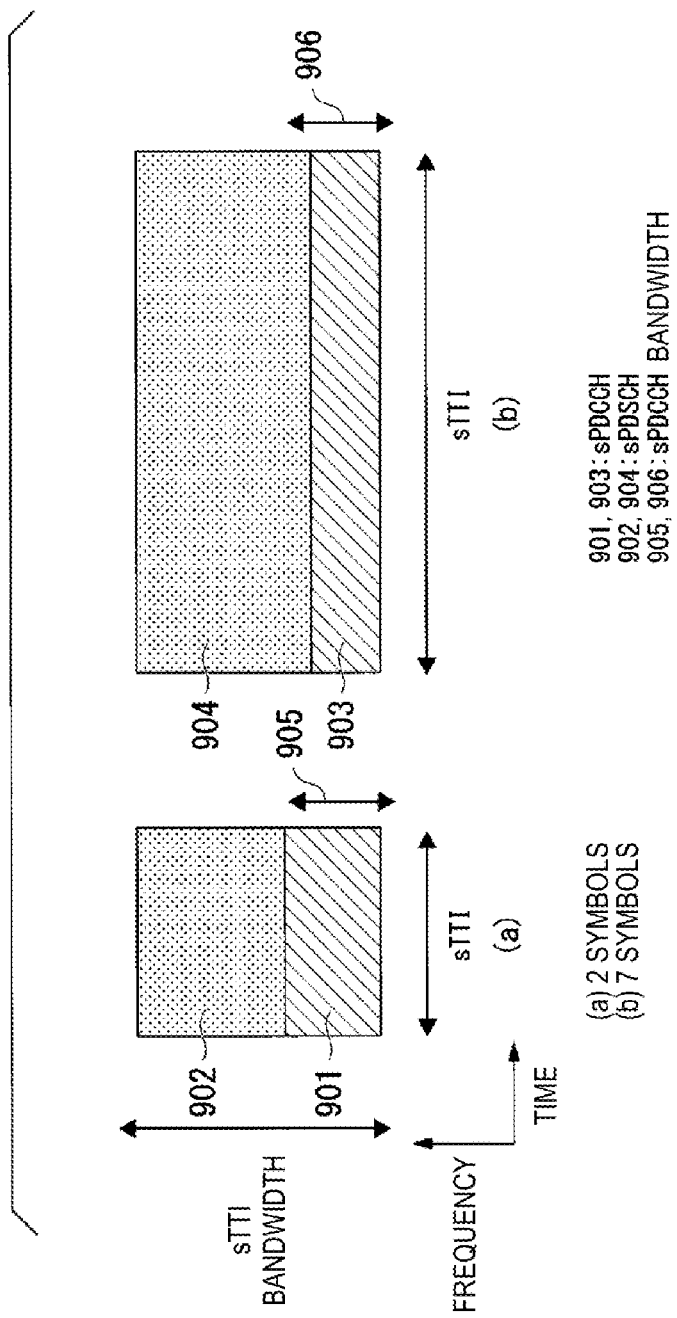
FIGS. 12A and 12B are schematic diagrams illustrating an example of frequency multiplexing of an sPDCCH and an sPDSCH in different sTTI lengths according to the first embodiment of the present invention.

FIGS. 12A and 12B are schematic diagrams illustrating examples of frequency multiplexing of the sPDCCH and the sPDSCH in different sTTI lengths according to the first embodiment of the present invention. Specifically, the sPDCCH bandwidth may be increased in a case that the length of the sTTI and/or the sPDCCH is reduced. Specifically, the sPDCCH bandwidth may be reduced in a case that the length of the sTTI and/or sPDCCH is increased. Specifically, the region of the sPDCCH may be specified only by information in the time region. Specifically, the region of the sPDCCH may be specified only by information in the frequency region. Specifically, the region of the sPDCCH may be specified by information in the time region and the frequency region.

The base station apparatus 3 may notify sTTI pattern information to the terminal apparatus 1 by a MAC CE, an RRC parameter (RRC signal) and the like. The terminal apparatus 1 may determine whether the transmission scheme for the sPDCCH and/or the transmission scheme for the sPDSCH is the CRS-based transmission scheme or the DMRS-based transmission scheme, based on the sTTI pattern information notified from the base station apparatus 3. The terminal apparatus 1 may switch the transmission scheme for the sPDCCH and/or the transmission scheme for the sPDSCH to the CRS-based transmission scheme or the DMRS-based transmission scheme, based on the sTTI pattern information notified from the base station apparatus 3.

Specifically, in a case that information indicating an arbitrary sTTI length is included in the sTTI pattern information notified from the base station apparatus 3, the terminal apparatus 1 may determine the transmission scheme for the sPDCCH and/or the transmission scheme for the sPDSCH to the CRS-based transmission scheme and use the CRS-based transmission scheme. In a case that information indicating the sTTI length is included in the sTTI pattern information notified from the base station apparatus 3 and that the information indicating the sTTI length is smaller than an arbitrary value K1, the terminal apparatus 1 may determine the CRS-based transmission scheme as the sPDCCH the transmission scheme and use the CRS-based transmission scheme.

Note that, as illustrated in the drawing, in a case that information indicating the sTTI length is included in the sTTI pattern information notified from the base station apparatus 3, the terminal apparatus 1 may determine whether the transmission scheme of the sPDCCH and/or the sPDSCH is the CRS-based transmission scheme or the DMRS transmission scheme according to whether information indicating the sTTI length is smaller than the arbitrary value K1.

FIG. 8 illustrates an example of an sPDCCH length determination table according to the first embodiment of the present invention.

In a case that information indicating an arbitrary sPDCCH length is included in the sTTI pattern information notified from the base station apparatus 3, the terminal apparatus 1 may determine the transmission scheme for the transmission scheme for the sPDCCH as the CRS-based transmission scheme and use the CRS-based transmission scheme. In a case that information indicating the sPDCCH length is included in the sTTI pattern information notified from the base station apparatus 3 and that the information indicating the sPDCCH length is smaller than an arbitrary value K2, the terminal apparatus 1 may determine the CRS-based transmission scheme as the sPDCCH the transmission scheme and use the CRS-based transmission scheme. In a case that information indicating the sPDCCH length is included in the sTTI pattern information notified from the base station apparatus 3 and that the information indicating the PDCCH length is equal to or greater than the arbitrary value K2, the terminal apparatus 1 may determine the DMRS-based transmission scheme as the sPDCCH the transmission scheme and use the DMRS-based transmission scheme.

FIG. 9 illustrates an example of an sPDSCH length determination table according to the first embodiment of the present invention.

In a case that information indicating an arbitrary sPDSCH length is included in the sTTI pattern information notified from the base station apparatus 3, the terminal apparatus 1 may determine to use the CRS-based transmission scheme as the transmission scheme for the transmission scheme for the sPDSCH and use the CRS-based transmission scheme. In a case that information indicating the sPDSCH length is included in the sTTI pattern information notified from the base station apparatus 3 and that the information indicating the sPDSCH length is smaller than an arbitrary value K3, the terminal apparatus 1 may determine the CRS-based transmission scheme as the transmission scheme of the sPDSCH and use the CRS-based transmission scheme. In a case that information indicating the sPDSCH length is included in the sTTI pattern information notified from the base station apparatus 3 and that the information indicating the sPDSCH length is equal to or greater than the arbitrary value K3, the terminal apparatus 1 may determine the DMRS-based transmission scheme as the transmission scheme of the sPDSCH and use the DMRS-based transmission scheme.

Here, information indicating the sPDSCH length may be included in the sTTI pattern information, or may be included in the second DL grant transmitted for the sPDCCH. Note that the information of the sPDSCH length included in the sTTI pattern information may be switched to the information of the sPDSCH length included in the sPDCCH.

Figure 10:
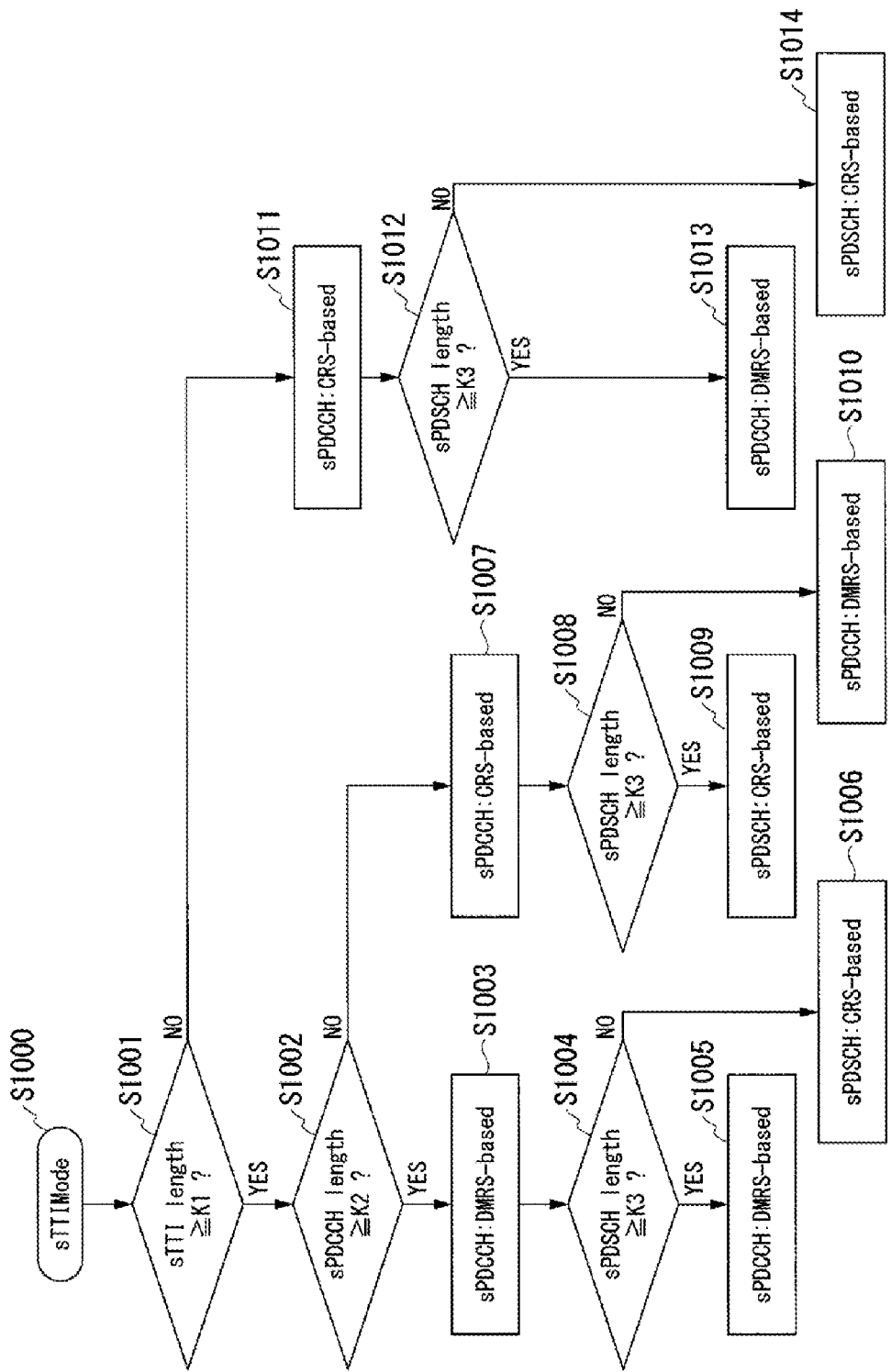
FIG. 10 is a flowchart of an example of a transmission scheme determination process according to the first embodiment of the present invention.

FIG. 10 is a flowchart of an example of a transmission scheme determination process according to the first embodiment of the present invention.

At step S1000, in a case that the sTTI pattern information included in the first DL grant (non-UE specific DCI and/or subframe specific DCI) transmitted on the PDCCH from the base station apparatus 3 is notified, the terminal apparatus 1 may start a process of determining whether each of the transmission scheme for the sPDCCH and the transmission scheme for the sPDSCH are the CRS-based transmission scheme or the DMRS transmission scheme, as the sTTI mode.

At step S1001, in a case that information indicating the sTTI length is included in the sTTI pattern information notified from the base station apparatus 3, the terminal apparatus 1 determines whether the information indicating the sTTI length is not smaller than the arbitrary value K1.

At step S1002, in a case that information indicating the sTTI length is not smaller than the arbitrary value K1 (step S1001; YES) and that information indicating the sPDCCH length is included in the sTTI pattern information notified from the base station apparatus 3, the terminal apparatus 1 determines whether information indicating the sPDCCH length is not smaller than the arbitrary value K2.

At step S1003, in a case that information indicating the sPDCCH length is included in the sTTI pattern information notified from the base station apparatus 3 and that the information indicating the sPDCCH length is not smaller than the arbitrary value K2 (step S1002; YES), the terminal apparatus 1 determines the DMRS-based transmission scheme as the transmission scheme for the sPDCCH and uses the DMRS-based transmission scheme.

At step S1004, the terminal apparatus 1 determines whether information indicating the sPDSCH length is not smaller than the arbitrary value K3 in a case that information indicating the sPDSCH length is included in the sTTI pattern information notified from the base station apparatus 3 and/or the second DL grant.

At step S1005, in a case that the information indicating the sPDSCH length is not smaller than the arbitrary value K3 (step S1004; YES), the terminal apparatus 1 determines the DMRS-based transmission scheme as the transmission scheme for the sPDSCH and uses the DMRS-based transmission scheme.

At step S1006, in a case that information indicating the sPDSCH length is smaller than the arbitrary value K3 (step S1004; NO), the terminal apparatus 1 determines the CRS-based transmission scheme as the transmission scheme for the sPDSCH, and uses the CRS-based transmission scheme.

At step S1007, in a case that information indicating the sPDCCH length is included in the sTTI pattern information notified from the base station apparatus 3 and that the information indicating the sPDCCH length is smaller than the arbitrary value K2 (step S1002; NO), the terminal apparatus 1 determines the CRS-based transmission scheme as the transmission scheme for the sPDCCH and uses the CRS-based transmission scheme.

At step S1008, in a case that information indicating the sPDSCH length is included in the sTTI pattern information notified from the base station apparatus 3 and/or the second DL grant, the terminal apparatus 1 determines whether information indicating the sPDSCH length is not smaller than the arbitrary value K3.

At step S1009, in a case that the information indicating the sPDSCH length is not smaller than the arbitrary value K3 (step S1008; YES), the terminal apparatus 1 determines the DMRS-based transmission scheme as the transmission scheme for the sPDSCH and uses the DMRS-based transmission scheme.

At step S1010, in a case that the information indicating the sPDSCH length is smaller than the arbitrary value K3 (step S1008; NO), the terminal apparatus 1 determines the CRS-based transmission scheme as the transmission scheme for the sPDSCH and uses the CRS-based transmission scheme.

At step S1011, in a case that the information indicating the sTTI length is smaller than the arbitrary value K1 (step S1001; NO), the terminal apparatus 1 determines the CRS-based transmission scheme as the transmission scheme for the sPDCCH and uses the CRS-based transmission scheme.

At step S1012, in a case that information indicating the sPDSCH length is included in the sTTI pattern information notified from the base station apparatus 3 and/or the second DL grant, the terminal apparatus 1 determines whether the information indicating the sPDSCH length is not smaller than the arbitrary value K3.

At step S1013, in a case that the information indicating the sPDSCH length is not smaller than the arbitrary value K3 (step S1012; YES), the terminal apparatus 1 determines the DMRS-based transmission scheme as the transmission scheme for the sPDSCH and uses the DMRS-based transmission scheme.

At step S1014, in a case that the information indicating the sPDSCH length is smaller than the arbitrary value K3 (step S1012; NO), the terminal apparatus 1 determines the CRS-based transmission scheme as the transmission scheme for the sPDSCH and uses the CRS-based transmission scheme.

Note that the arbitrary values K1, K2 and K3 may be the same value, or different values.

Note that, in the transmission scheme determination process according to the first embodiment, the transmission mode information described in the second embodiment may be based on a higher layer parameter, and the transmission mode information described in the second embodiment may not be based on a higher layer parameter. In other words, the first embodiment and the second embodiment may be combined.

As described above, the terminal apparatus 1 according to the first embodiment includes the reception unit 105 configured to receive sTTI pattern information indicating the length of the sTTI, and a decoding unit (the decoding unit 1051) configured to decode the short physical downlink control channel in accordance with the transmission scheme for the short physical downlink control channel, and decode the short physical downlink shared channel in accordance with the transmission scheme for the short physical downlink shared channel. The transmission scheme for the short physical downlink control channel and the transmission scheme for the short physical downlink shared channel are given based on the sTTI pattern information.

This allows the terminal apparatus 1 to efficiently receive downlink data. For example, the terminal apparatus 1 can achieve coexistence with a terminal apparatus corresponding to a previous release. As a result, the downlink resources can be efficiently used, and downlink data can be efficiently received.

Second Embodiment

In the second embodiment, a case where a transmission mode is configured by a parameter of a higher layer is described. Note that descriptions of the configurations similar to those of the first embodiment are omitted, and configurations of the second embodiment different from those of the first embodiment are mainly described.

The base station apparatus 3 transmits Transmission Mode (TM) information to the terminal apparatus 1 by RRC signaling. Specifically, the base station apparatus 3 may transmit common configuration information (Common configuration) or independent configuration information (Independent configuration), as transmission mode information.

The common configuration information is configuration information configured for the PDSCH and the sPDSCH in common with each other. The common configuration information may be shared with the transmission mode notification information (antennainfodedicated and/or antennainfodedicated-r10).

The terminal apparatus 1 is designed such that, in a case that common configuration information is transmitted (notified, or indicated) from the base station apparatus 3 by RRC signaling as transmission mode information, terminal apparatus 1 uses the same transmission mode for the TTI mode and the sTTI mode, based on the common configuration information regardless of whether the transmission mode for the PDSCH (TTI mode (for the PDSCH transmission mode)) or the sTTI mode (for the sPDSCH transmission mode).

For example, in a case that a TM3 as transmission mode is transmitted (notified or indicated) from the base station apparatus 3 as common configuration information, the terminal apparatus 1 determines the transmission mode for the TTI mode as the TM3, and the transmission mode for the sTTI mode as the TM3.

The independent configuration information is configuration information independently (flexibly or individually) configured for each of the PDSCH and the sPDSCH. The independent configuration information may be multiple parameters including, for example, a parameter for the TTI mode and a parameter for the sTTI mode. The independent configuration information may be a single parameter including a parameter for the TTI mode and a parameter for the sTTI mode. The transmission mode information used for the transmission mode for the sTTI mode may be configured by the DCI format (TM independent DCI format, TM-dependent DCI format and the like) of the DCI transmitted on the sPDCCH as independent configuration information.

The terminal apparatus 1 determines the TTI mode (for the PDSCH transmission mode) and the sTTI mode (for the sPDSCH transmission mode), based on one or more multiple types of configuration information such as the common configuration information and the independent configuration information.

Now a DCI format of DCI transmitted on the PDCCH is described.

FIG. 13 is a schematic diagram illustrating an example in a DCI format of a transmission mode for a PDSCH according to the second embodiment of the present invention. FIG. 14 is a schematic diagram illustrating an example of the DCI format in the transmission mode for the sPDSCH according to the second embodiment of the present invention. FIG. 15 is a schematic diagram illustrating another example of the DCI format in the transmission mode for the sPDSCH according to the second embodiment of the present invention.

The terminal apparatus 1 may determine the DCI format of the PDCCH to be monitored, and the transmission scheme for the PDSCH and/or the sPDSCH according to which of multiple transmission modes is the transmission mode transmitted by the base station apparatus 3.

As illustrated in FIG. 13, the terminal apparatus 1 may determine the transmission scheme of the PDSCH and the DCI format of the PDCCH to be monitored based on the transmission mode. As illustrated in FIG. 14, the terminal apparatus 1 may determine the transmission scheme of the sPDSCH and the DCI format of the sPDCCH to be monitored based on the transmission mode. As illustrated in FIG. 15, the terminal apparatus 1 may determine the transmission scheme of the sPDSCH and the DCI format of the sPDCCH to be monitored based on the transmission mode.

Figure 16:
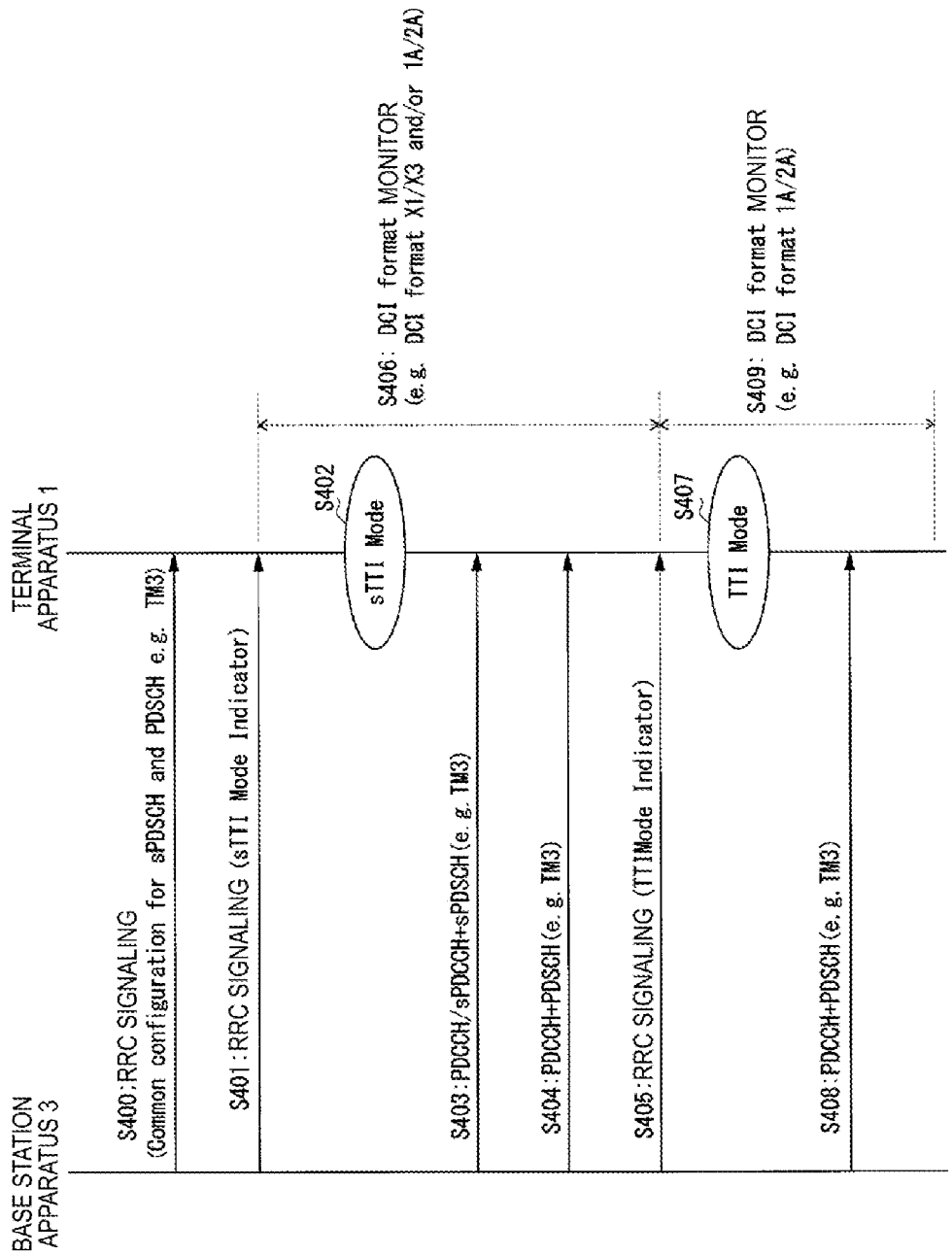
FIG. 16 is a sequence diagram illustrating an exemplary case that a PDSCH transmission mode and an sPDSCH transmission mode are configured in common with each other in the second embodiment of the present invention.

FIG. 16 is a sequence diagram illustrating an exemplary case where a PDSCH transmission mode and an sPDSCH transmission mode are configured in common with each other in the second embodiment of the present invention.

Specifically, FIG. 16 illustrates an exemplary case where common configuration information for the PDSCH and the sPDSCH is transmitted from the base station apparatus 3 to the terminal apparatus 1 as transmission mode information.

At step S400, the base station apparatus 3 transmits transmission mode information to the terminal apparatus 1 by using RRC signaling. For example, the base station apparatus 3 transmits, to the terminal apparatus 1, common configuration information in which the transmission mode for both the PDSCH and the sPDSCH is the transmission mode TM3 as transmission mode information by using RRC signaling.

At step S401, the base station apparatus 3 may transmit sTTI pattern information to the terminal apparatus 1 by using RRC signaling. Here, the sTTI mode may be configured in the terminal apparatus 1 that has received the sTTI pattern information. In other words, the sTTI mode may be implicitly configured in the terminal apparatus 1 that has received the sTTI pattern information.

Alternatively, at step S401, the base station apparatus 3 may transmit information regarding the sTTI mode (e.g. sTTI Mode indicator) to the terminal apparatus 1 as another parameter by using RRC signaling. Here, the sTTI mode may be configured in the terminal apparatus 1 that has received the information regarding the sTTI mode. In other words, the sTTI mode may be explicitly configured in the terminal apparatus 1 by information regarding the sTTI mode.

At step S402, the terminal apparatus 1 configures the sTTI mode, based on the information regarding sTTI.

At step S406, the terminal apparatus 1 in which the sTTI mode is configured determines the transmission mode of the PDSCH, the transmission mode of the PDCCH, the transmission mode of the sPDSCH, the transmission mode of the sPDCCH, and the type of the DCI format to be monitored based on the RRC signaling received at step S400 and step S401.

For example, the transmission mode for the PDSCH may be the transmission mode TM3 (Mode3), and the DCI format of the PDCCH to be monitored may be a DCI format 1A/2A corresponding to the transmission mode TM3 (see FIG. 13). The transmission mode for the sPDCCH may be the transmission mode TM3 (Mode 3), and the DCI format of the sPDCCH to be monitored may be DCI format X1/X3 corresponding to the transmission mode TM3 (see FIG. 14).

At step S403, the base station apparatus 3 may perform, to the terminal apparatus 1, transmission of the sPDSCH and transmission of the PDCCH and/or the sPDCCH corresponding to the sPDSCH in the transmission mode TM3.

At step S404, the base station apparatus 3 may perform, to the terminal apparatus 1, transmission of the PDCCH and the PDSCH corresponding to the PDSCH in the transmission mode TM3.

The terminal apparatus 1 may monitor the DCI format of the PDCCH (DCI format 1A/2A), and monitor the DCI format of the sPDCCH (DCI format X1/X3) until the TTI Mode Indicator is notified by the RRC signaling.

Note that at step S401, in a case that the base station apparatus 3 has not transmitted the sTTI pattern information to the terminal apparatus 1, and/or the sTTI bandwidth and/or the sTTI pattern information has not configured in a unit of a subframe, the terminal apparatus 1 may be in the TTI mode.

At step S405, the base station apparatus 3 may transmit, to the terminal apparatus 1, information regarding the TTI mode (e.g. TTI Mode indicator) as another parameter by using RRC signaling.

In a case that the terminal apparatus 1 has not configured to the sTTI bandwidth, and/or the sTTI pattern information in a unit of a subframe, the terminal apparatus 1 may be in the TTI mode.

At step S407, the terminal apparatus 1 configures the TTI mode (a mode capable of transmitting and/or receiving the PDCCH and/or the PDSCH) based on the information regarding the TTI mode.

At step S409, the terminal apparatus 1 may start monitoring of the DCI format of the PDCCH (DCI format 1A/2A).

At step S408, the base station apparatus 3 may perform, to the terminal apparatus 1 configured to the TTI mode at step S405, the PDCCH transmission and the PDSCH transmission corresponding to the transmission mode TM3, for example.

Figure 17:
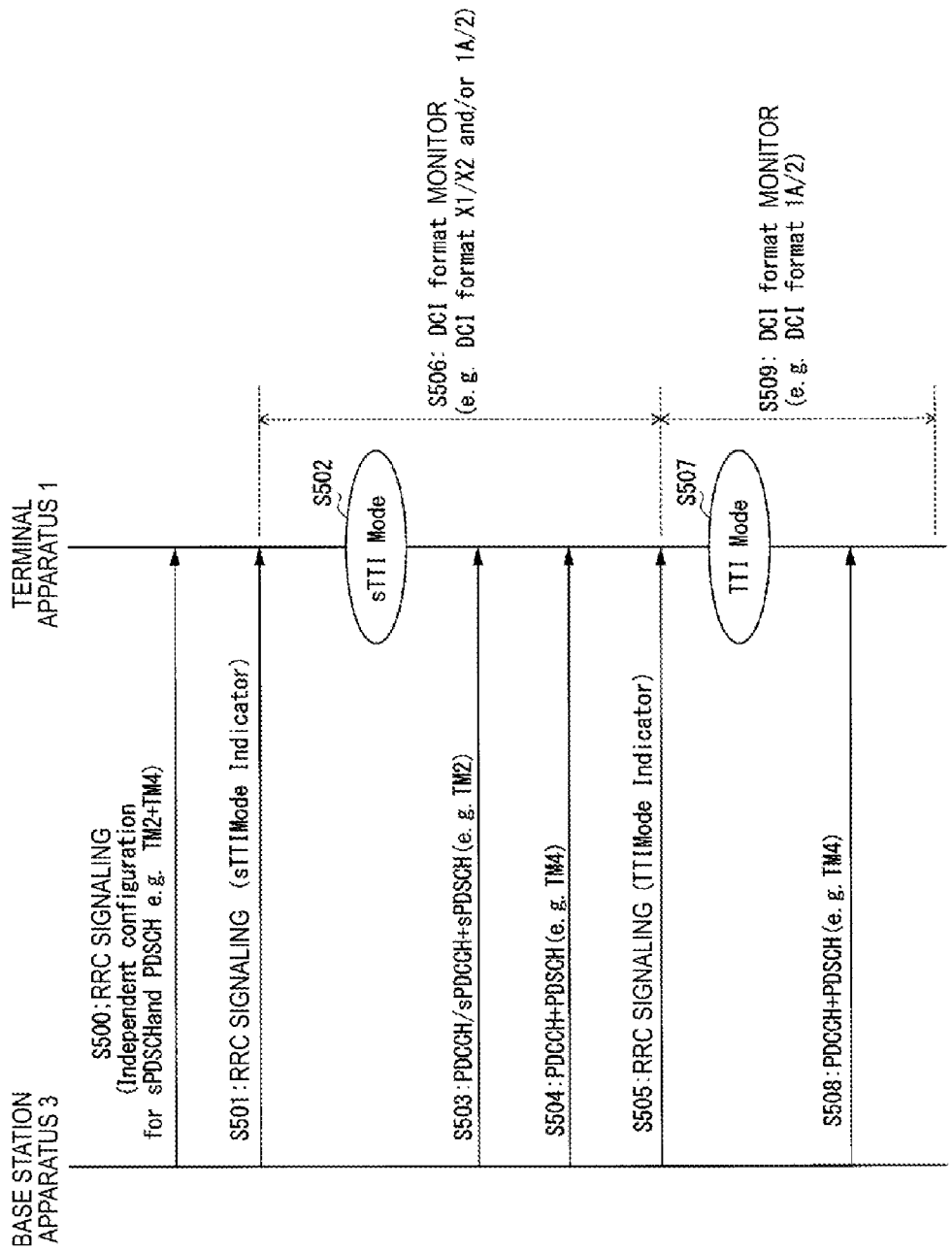
FIG. 17 is a sequence diagram illustrating an exemplary case that the sPDSCH transmission mode and the PDSCH transmission mode are independently configured in the second embodiment of the present invention.

FIG. 17 is a sequence diagram illustrating an exemplary case where the sPDSCH transmission mode and the PDSCH transmission mode are independently configured in the second embodiment of the present invention.

Specifically, FIG. 17 illustrates an exemplary where that independent configuration information for each of the PDSCH and the sPDSCH is transmitted as transmission mode information from the base station apparatus 3 to the terminal apparatus 1.

At step S500, the base station apparatus 3 transmits, to the terminal apparatus 1, independent configuration information as transmission mode information by using RRC signaling. For example, the base station apparatus 3 transmits, to the terminal apparatus 1, independent configuration information in which the transmission mode for the PDSCH is a transmission mode TM4 (Mode 4) and the transmission mode for the sPDSCH is a transmission mode TM2 (Mode 2) as transmission mode information by using RRC signaling.

At step S501, the base station apparatus 3 may transmit sTTI pattern information to the terminal apparatus 1 by using RRC signaling. Here, the sTTI mode may be configured in the terminal apparatus 1 that has received the sTTI pattern information. In other words, the sTTI mode may be implicitly configured in the terminal apparatus 1 that has received the sTTI pattern information. Alternatively, at step S501, the base station apparatus 3 may transmit, to the terminal apparatus 1, information regarding the sTTI mode (e.g. sTTI Mode indicator) as another parameter by using RRC signaling. Here, the sTTI mode may be configured in the terminal apparatus 1 that has received the information regarding the sTTI mode. In other words, the sTTI mode may be explicitly configured in the terminal apparatus 1 by information regarding the sTTI mode.

At step S502, the terminal apparatus 1 configures the sTTI mode, based on information regarding the sTTI mode.

At step S506, the terminal apparatus 1 in which the sTTI mode is configured determines the transmission mode of the PDSCH, the transmission mode of the PDCCH, the transmission mode of the sPDSCH, the transmission mode of the sPDCCH, and the type of the DCI format to be monitored based on the RRC signaling received at step S500 and step S501.

For example, the transmission mode for the PDSCH may be the transmission mode TM4 (Mode 4), and the DCI format to be monitored of the PDCCH may be the DCI format 1A/2 corresponding to the transmission mode TM4 (see FIG. 13). The transmission mode for the sPDSCH may be the transmission mode TM2 (Mode 2), and the DCI format of the sPDCCH to be monitored may be a DCI format X1/X2 corresponding to the transmission mode TM2 (see FIG. 14).

At step S503, the base station apparatus 3 may perform, to the terminal apparatus 1, transmission of the PDCCH and/or the sPDCCH corresponding to the sPDSCH and transmission of the sPDSCH in the transmission mode TM2.

At step S504, the base station apparatus 3 may perform, to the terminal apparatus 1, transmission of the PDSCH and the PDCCH corresponding to the PDSCH in the transmission mode TM4.

The terminal apparatus 1 may monitor the DCI format of the PDCCH (DCI format 1A/2) and monitor the DCI format of the sPDCCH (DCI format X1/X2) until the TTI Mode Indicator is notified by the RRC signaling.

Note that, at step S501, in a case that the base station apparatus 3 has not transmitted the sTTI pattern information to the terminal apparatus 1, and/or the sTTI bandwidth and/or the sTTI pattern information has not configured in a unit of a subframe, the terminal apparatus 1 may be in the TTI mode.

At step S505, the base station apparatus 3 may transmit, to the terminal apparatus 1, information regarding the TTI mode (e.g. TTI Mode indicator) as another parameter by using RRC signaling.

At step S507, the terminal apparatus 1 configures the TTI mode (a mode capable of transmitting and/or receiving the PDCCH and/or the PDSCH), based on the information regarding the TTI mode.

At step S509, the terminal apparatus 1 may start monitoring of the DCI format of the PDCCH (DCI format 1A/2).

At step S508, the base station apparatus 3 may perform, to the terminal apparatus 1 configured to the TTI mode at step S505, PDSCH transmission and PDCCH transmission corresponding to the transmission mode TM4, for example.

Figure 18:
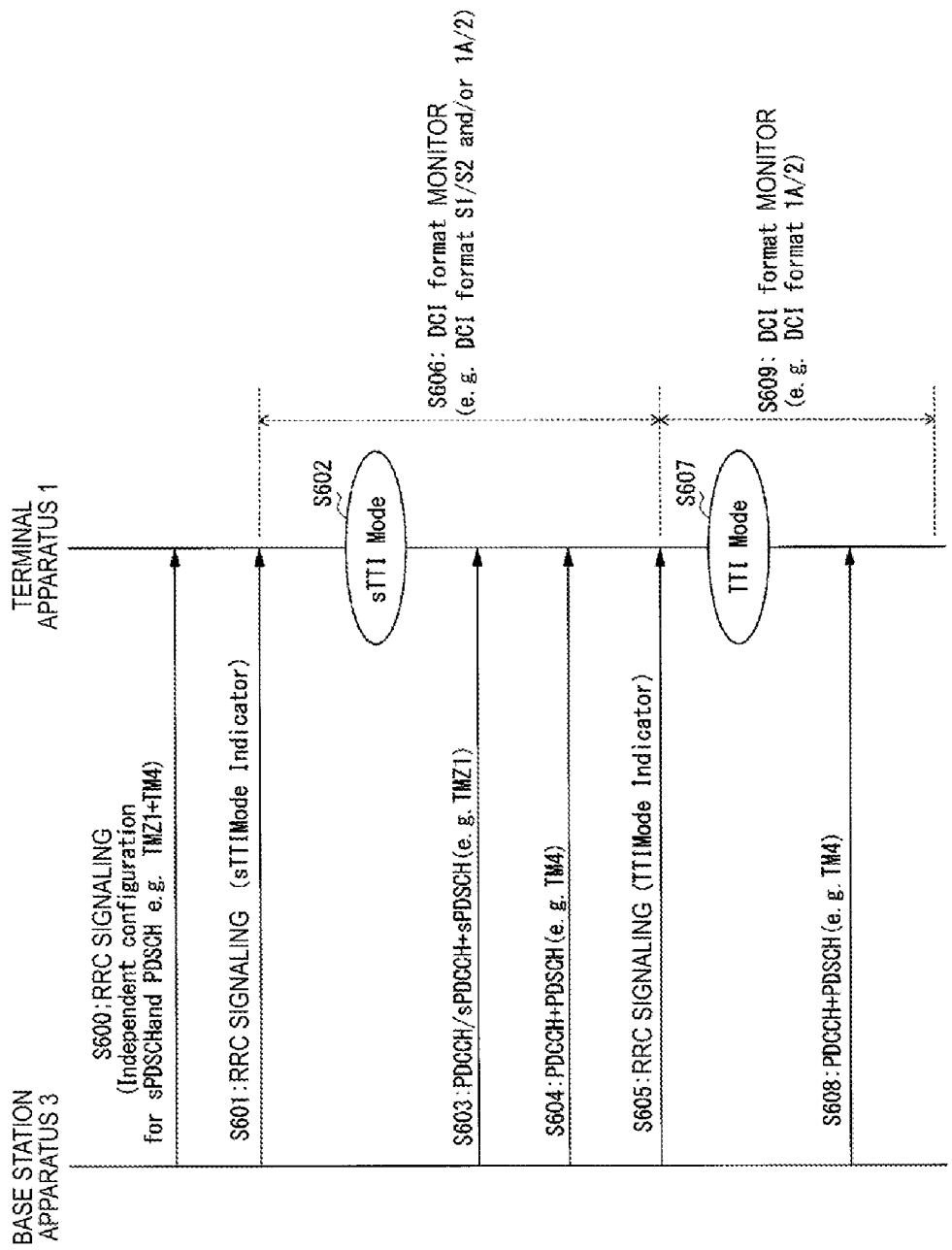
FIG. 18 is a sequence diagram illustrating another exemplary case that the sPDSCH transmission mode and the PDSCH transmission mode are independently configured in the second embodiment of the present invention.

FIG. 18 is a sequence diagram illustrating another exemplary case that the sPDSCH transmission mode and the PDSCH transmission mode are independently configured in the second embodiment of the present invention.

Specifically, FIG. 18 illustrates an exemplary case where independent configuration information is transmitted for each of the PDSCH and the sPDSCH as transmission mode information from the base station apparatus 3 to the terminal apparatus 1.

At step S600, the base station apparatus 3 may transmit transmission mode information to the terminal apparatus 1 by using RRC signaling. For example, the base station apparatus 3 transmits, to the terminal apparatus 1, independent configuration information in which the transmission mode for the PDSCH is the transmission mode TM4 and the transmission mode for the sPDSCH is a transmission mode TMZ1 as the transmission mode information, by using RRC signaling.

At step S601, the base station apparatus 3 may transmit sTTI pattern information to the terminal apparatus 1 by using RRC signaling. Here, the sTTI mode may be configured in the terminal apparatus 1 that has received the sTTI pattern information. In other words, the sTTI mode may be implicitly configured in the terminal apparatus 1 that has received the sTTI pattern information.

Alternatively, at step S601, the base station apparatus 3 may transmit, to the terminal apparatus 1, information regarding the sTTI mode (e.g. sTTI Mode indicator) as another parameter by using RRC signaling. Here, the sTTI mode may be configured in the terminal apparatus 1 that has received the information regarding the sTTI mode. In other words, the sTTI mode may be explicitly configured in the terminal apparatus 1 by information regarding the sTTI mode.

At step S602, the terminal apparatus 1 configures the sTTI mode, based on information regarding the sTTI mode.

At step S606, the terminal apparatus 1 in which the sTTI mode is configured determines the transmission mode of the PDSCH, the transmission mode for the PDCCH, the transmission mode of the sPDSCH, the transmission mode of sPDCCH, and the type of the DCI format to be monitored based on the RRC signaling received at step S600 and at step S601.

For example, the transmission mode for the PDSCH may be the transmission mode TM4 (Mode 4), and the DCI format to be monitored of the PDCCH may be the DCI format 1A/2 corresponding to the transmission mode TM4 (see FIG. 13). The transmission mode for the sPDSCH may be the transmission mode TMZ1 (Mode Z1), and the DCI format of the sPDCCH to be monitored may be DCI format S1/S2 corresponding to the transmission mode TMZ1 (FIG. 15).

At step S603, the base station apparatus 3 may perform, to the terminal apparatus 1, the sPDSCH transmission, and the sPDCCH transmission and/or the PDCCH transmission corresponding to the sPDSCH in the transmission mode TMZ1.

At step S604, the base station apparatus 3 may perform, to the terminal apparatus 1, transmission of the PDCCH and the PDSCH corresponding to the PDSCH in the transmission mode TM4.

The terminal apparatus 1 may monitor the DCI format of the PDCCH (DCI format 1A/2) and monitor the DCI format of the sPDCCH (DCI format S1/S2) until the TTI Mode Indicator is notified by the RRC signaling.

Note that, at step S601, in a case that the base station apparatus 3 has not transmitted the sTTI pattern information to the terminal apparatus 1, and/or the sTTI bandwidth and/or the sTTI pattern information has not configured in a unit of a subframe, the terminal apparatus 1 may be in the TTI mode.

At step S605, the base station apparatus 3 may transmit, to the terminal apparatus 1, information regarding the TTI mode (e.g. TTI Mode indicator) as another parameter by using RRC signaling.

In a case that the terminal apparatus 1 has not configured to the sTTI bandwidth, and/or the sTTI pattern information in a unit of a subframe, the terminal apparatus 1 may be in the TTI mode.

At step S607, the terminal apparatus 1 configures a TTI mode (a mode capable of transmitting and/or receiving the PDCCH and/or the PDSCH), based on the information regarding the TTI mode.

At step S609, the terminal apparatus 1 may start monitoring of the DCI format of the PDCCH (DCI format 1A/2).

At step S608, the base station apparatus 3 may transmit, to the terminal apparatus 1 configured to the TTI mode at step S605, PDSCH transmission and PDCCH transmission corresponding to the transmission mode TM4, for example.

As described above, the terminal apparatus 1 according to the second embodiment includes a higher layer processing unit (the processing unit 101) configured to configure transmission mode information, and the reception unit 105 configured to receive a physical downlink shared channel and a short physical downlink shared channel. The transmission mode information indicates a transmission mode for the physical downlink shared channel and a transmission mode for the short physical downlink shared channel.

In the terminal apparatus 1 according to the second embodiment, the downlink control information format to be monitored, the transmission scheme for the short physical downlink shared channel, and multiple antenna ports used for the short physical downlink shared channel transmission may be determined based on the transmission mode for the short physical downlink shared channel.

In the terminal apparatus 1 according to the second embodiment, the transmission mode information may include a first parameter and a second parameter, the first parameter may indicate the transmission mode for the physical downlink shared channel, and the second parameter may indicate the transmission mode for the short physical downlink shared channel.

In the terminal apparatus 1 according to the second embodiment, the transmission mode information may include one parameter, and the one parameter may indicate the transmission mode common information for the physical downlink shared channel and the short physical downlink shared channel.

The base station apparatus 3 according to the second embodiment includes a higher layer processing unit (the processing unit 301) configured to configure the transmission mode information in the terminal apparatus 1, and the transmission unit 307 configured to transmit the physical downlink shared channel and the short physical downlink shared channel. The transmission mode information indicates the transmission mode for the physical downlink shared channel and the transmission mode for the short physical downlink shared channel.

This allows the terminal apparatus 1 to efficiently receive downlink data. For example, the terminal apparatus 1 can achieve coexistence with a terminal apparatus corresponding to a previous release. As a result, the downlink resources can be efficiently used, and downlink data can be efficiently received.

Third Embodiment

In the third embodiment, a case that is different from the method of transmitting downlink data of the radio communication system described in the first embodiment is described. Note that description for configurations similar to those of the first embodiment and the second embodiment are omitted, and configurations of the third embodiment different from those of the first embodiment and the second embodiment are mainly described.

Figure 19:
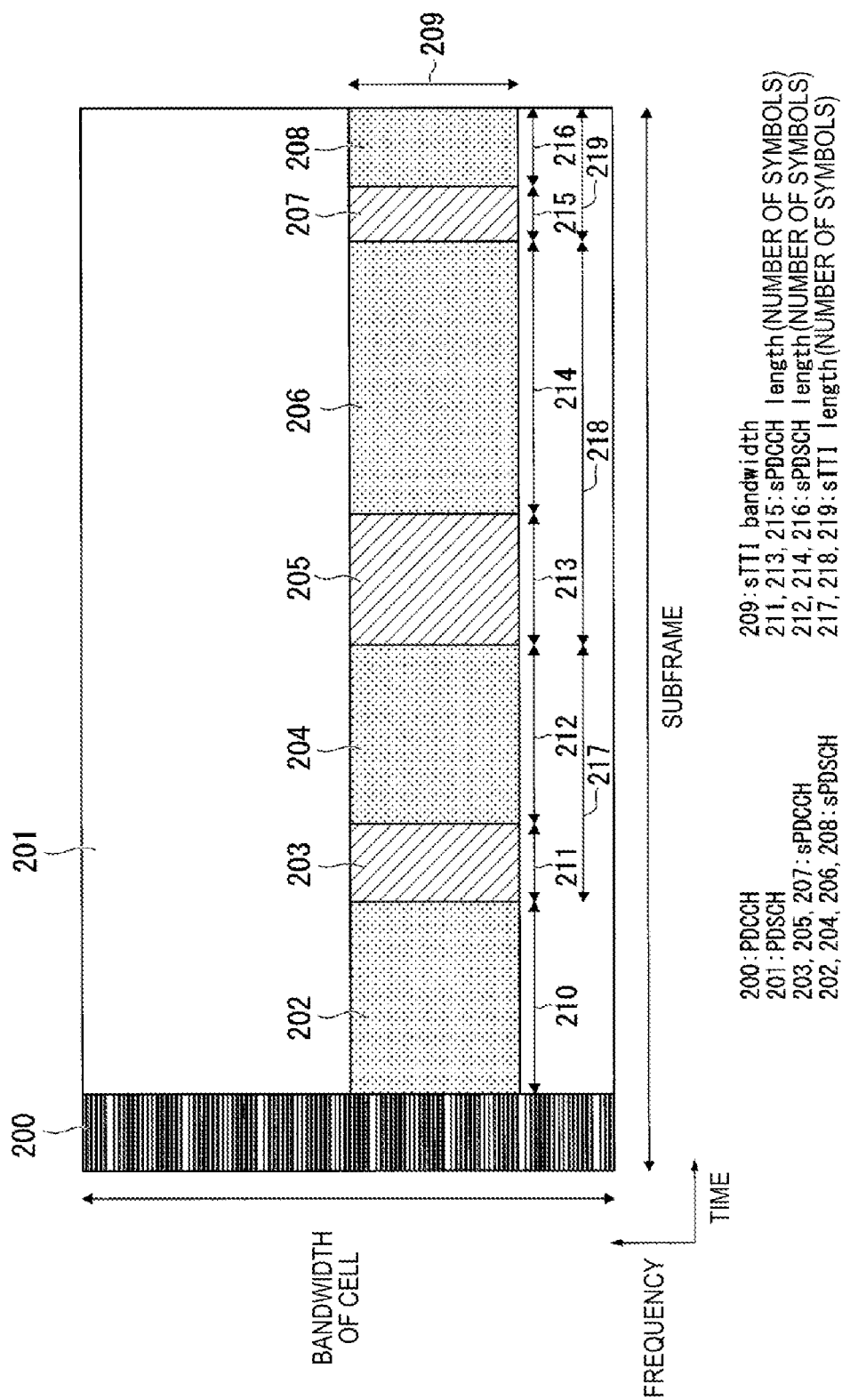
FIG. 19 is a schematic diagram illustrating an example of a downlink data transmission method according to a third embodiment of the present invention.

FIG. 19 is a schematic diagram illustrating an example of a downlink data transmission method according to the third embodiment of the present invention.

The illustrated example illustrates a method of transmitting downlink data, and the base station apparatus 3 may perform, to the terminal apparatus 1, transmission on a PDCCH 200 and transmission of a PDSCH 201 in a prescribed time and at a frequency of a prescribed cell and a frequency bandwidth of a prescribed cell in one subframe. The base station apparatus 3 may perform transmission on one or more sPDCCHs and transmission on one or more the sPDSCHs at a frequency bandwidth of a prescribed cell and a frequency of a prescribed cell transmitted on the PDSCH 201 in a part or all of a prescribed time.

Here, one subframe may be transmitted by using a prescribed transmission time interval (TTI).

The base station apparatus 3 may perform, by using a prescribed short transmission time interval (sTTI), transmission on one sPDCCH and transmission on one sPDSCH in a part or all of a prescribed time at a frequency bandwidth of a prescribed cell and a frequency of a prescribed cell for transmission on the PDSCH.

Note that, in the base station apparatus 3, transmission on the sPDCCH may be performed by using the sTTI, and transmission on the sPDSCH may be performed by using sTTI. Here, the lengths of the TTI and the sTTI are referred to as a TTI length and an sTTI length, respectively. Each of the TTI length and the sTTI length may be defined by the number of the symbols, or by the time length.

For example, in an sTTI length 217, the base station apparatus 3 may transmit an sPDCCH 203 of an sPDCCH length 211, and transmit an sPDSCH 204 of an sPDSCH length 212.

In an sTTI length 218, the base station apparatus 3 may transmit an sPDCCH 205 of an sPDCCH length 213, and may transmit an sPDSCH 206 of an sPDSCH length 214, for example.

In an sTTI length 219, the base station apparatus 3 may transmit an sPDCCH 207 of sPDCCH length 215, and may transmit an sPDSCH 208 of an sPDSCH length 216, for example.

For example, the base station apparatus 3 may perform transmission such that transmission on the sPDCCH is included in the PDCCH 200, and may transmit an sPDSCH 202 of an sPDSCH length 210.

Here, the sPDCCHs 203, 205 and 207 may be the same sPDCCH length, or different sPDCCH lengths. The sPDSCHs 202, 204, 206 and 208 may be the same sPDSCH length, or different sPDSCH lengths. The sTTI lengths 217, 218 and 219 may be the same sTTI length, or different sTTI lengths.

The sPDCCHs 203, 205 and 207 and the sPDSCHs 202, 204, 206 and 208 transmitted by using the sTTI lengths 217, 218 and 219 may be transmitted by using the same frequency bandwidth (the sTTI bandwidth 209), or by using different frequency bandwidths (the sTTI bandwidths) in the sTTI lengths 217, 218, and 219.

The base station apparatus 3 may transmit downlink control information including information regarding sPDCCHs such as the carrier aggregation level and the frequency assignment information of the sPDSCH and the sPDCCH for the sPDSCHs 203, 205 and 207 and/or the sPDSCHs 202, 204, 206 and 208 in transmission on the PDSCH 201 in the PDCCH 200.

Thus, effects similar to those of the first embodiment and the second embodiment can be achieved.

A program running on each of the base station apparatus 3 and the terminal apparatus 1 according to the embodiments of the present invention may be a program that controls a Central Processing Unit (CPU) and the like (a program for causing a computer to operate) in such a manner as to enable the functionalities in the above-described embodiments according to aspects of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Moreover, the terminal apparatus 1 and the base station apparatus 3 according to the embodiments may be partially achieved by a computer. In this case, this configuration may be realized by recording a program for realizing such control functions on a computer-readable recording medium and causing a computer system to read the program recorded on the recording medium for execution.

Note that it is assumed that the "computer system" refers to a computer system built into the terminal apparatus 1 or the base station apparatus 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

The base station apparatus 3 according to the above-described embodiments can be achieved as an aggregation (a device group) constituted of multiple devices. Devices constituting such a device group may be each equipped with some or all portions of each function or each functional block of the base station apparatus 3 in the above-described embodiments. It is only required that the device group itself include general functions or general functional blocks of the base station apparatus 3. Furthermore, the terminal apparatus 1 according to the above-described embodiment can also communicate with the base station apparatus as the aggregation.

Furthermore, the base station apparatus 3 in the above-described embodiments may be an Evolved Universal Terrestrial Radio Access Network (EUTRAN). Furthermore, the base station apparatus 3 according to the above-described embodiments may have some or all portions of a function of a node higher than an eNodeB.

Furthermore, some or all portions of each of the terminal apparatus 1 and the base station apparatus 3 according to the above-described embodiments may be achieved as an LSI which is a typical integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, the terminal apparatus 1 has been described as an example of a communication device in the above-described embodiments, but the present invention is not limited to such a terminal apparatus, and is applicable to a terminal apparatus or a communication device of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the above-described embodiments are also included in the technical scope of the present invention. Furthermore, a configuration in which a constituent element that achieves the same effect is substituted for the one that is described in the embodiments is also included in the technical scope of the present invention.

(Supplementary Note 1) A terminal apparatus including: a higher layer processing unit configured to configure transmission mode information; and a reception unit configured to receive a physical downlink shared channel and a short physical downlink shared channel, wherein the transmission mode information indicates a transmission mode for the physical downlink shared channel and a transmission mode for the short physical downlink shared channel.

(Supplementary Note 2) The terminal apparatus according to (Supplementary Note 1), wherein a downlink control information format to be monitored, a transmission scheme for the short physical downlink shared channel, and multiple antenna ports to be used for transmission of the short physical downlink shared channel are determined based on the transmission mode for the short physical downlink shared channel.

(Supplementary Note 3) The terminal apparatus according to (Supplementary Note 1), wherein the transmission mode information includes a first parameter and a second parameter, the first parameter indicates the transmission mode for the physical downlink shared channel; and the second parameter indicates the transmission mode for the short physical downlink shared channel.

(Supplementary Note 4) The terminal apparatus according to (Supplementary Note 1), wherein the transmission mode information includes one parameter; and the one parameter indicates transmission mode common information for the physical downlink shared channel and the short physical downlink shared channel.

(Supplementary Note 5) A base station apparatus including: a higher layer processing unit configured to configure transmission mode information in a terminal apparatus; and a transmission unit configured to transmit a physical downlink shared channel and a short physical downlink shared channel, wherein the transmission mode information indicates a transmission mode for the physical downlink shared channel and a transmission mode for the short physical downlink shared channel.

(Supplementary Note 6) The base station apparatus according to (Supplementary Note 5), wherein a downlink control information format to be monitored, a transmission scheme for the short physical downlink shared channel, and multiple antenna ports to be used for transmission of the short physical downlink shared channel are determined based on the transmission mode for the short physical downlink shared channel.

(Supplementary Note 7) The base station apparatus according to (Supplementary Note 5), wherein the transmission mode information includes a first parameter and a second parameter; the first parameter indicates the transmission mode for the physical downlink shared channel; and the second parameter indicates the transmission mode for the short physical downlink shared channel.

(Supplementary Note 8) The base station apparatus according to (Supplementary Note 5), wherein the transmission mode information includes one parameter; and the one parameter indicates transmission mode common information for the physical downlink shared channel and the short physical downlink shared channel.

(Supplementary Note 9) A communication method used for a terminal apparatus, the communication method including: configuring transmission mode information; and receiving a physical downlink shared channel and a short physical downlink shared channel, wherein the transmission mode information indicates a transmission mode for the physical downlink shared channel and a transmission mode for the short physical downlink shared channel.

(Supplementary Note 10) The method according to (Supplementary Note 9), wherein a downlink control information format to be monitored, a transmission scheme for the short physical downlink shared channel, and multiple antenna ports to be used for transmission of the short physical downlink shared channel are determined based on the transmission mode for the short physical downlink shared channel.

(Supplementary Note 11) The method according to (Supplementary Note 9), wherein the transmission mode information includes a first parameter and a second parameter; the first parameter indicates the transmission mode for the physical downlink shared channel; and the second parameter indicates the transmission mode for the short physical downlink shared channel.

(Supplementary Note 12) The method according to (Supplementary Note 9), wherein the transmission mode information includes one parameter; and the one parameter indicates transmission mode common information for the physical downlink shared channel and the short physical downlink shared channel.

(Supplementary Note 13) A communication method used for a base station apparatus, the communication method including: configuring transmission mode information in a terminal apparatus; and transmitting a physical downlink shared channel and a short physical downlink shared channel, wherein the transmission mode information indicates a transmission mode for the physical downlink shared channel and a transmission mode for the short physical downlink shared channel.

(Supplementary Note 14) The method according to (Supplementary Note 13), wherein a downlink control information format to be monitored, a transmission scheme for the short physical downlink shared channel, and multiple antenna ports to be used for transmission of the short physical downlink shared channel are determined based on the transmission mode for the short physical downlink shared channel.

(Supplementary Note 15) The method according to (Supplementary Note 13), wherein the transmission mode information includes a first parameter and a second parameter; the first parameter indicates the transmission mode for the physical downlink shared channel; and the second parameter indicates the transmission mode for the short physical downlink shared channel.

(Supplementary Note 16) The method according to (Supplementary Note 13), wherein the transmission mode information includes one parameter; and the one parameter indicates transmission mode common information for the physical downlink shared channel and the short physical downlink shared channel.

(Supplementary Note 17) An integrated circuit to be mounted in a terminal apparatus, the integrated circuit being configured to perform: a higher layer processing function of configuring transmission mode information; and a reception function of receiving a physical downlink shared channel and a short physical downlink shared channel, wherein the transmission mode information indicates a transmission mode for the physical downlink shared channel and a transmission mode for the short physical downlink shared channel.

(Supplementary Note 18) The integrated circuit according to (Supplementary Note 17), wherein a downlink control information format to be monitored, a transmission scheme for the short physical downlink shared channel, and multiple antenna ports to be used for transmission of the short physical downlink shared channel are determined based on the transmission mode for the short physical downlink shared channel.

(Supplementary Note 19) The integrated circuit according to (Supplementary Note 17), wherein the transmission mode information includes a first parameter and a second parameter; the first parameter indicates the transmission mode for the physical downlink shared channel; and the second parameter indicates the transmission mode for the short physical downlink shared channel.

(Supplementary Note 20) The integrated circuit according to (Supplementary Note 17), wherein the transmission mode information includes one parameter; and the one parameter indicates transmission mode common information for the physical downlink shared channel and the short physical downlink shared channel.

(Supplementary Note 21) An integrated circuit to be mounted in a base station apparatus, the integrated circuit being configured to perform: a higher layer processing function of configuring transmission mode information in a terminal apparatus; and a transmission function of transmitting a physical downlink shared channel and a short physical downlink shared channel, wherein the transmission mode information indicates a transmission mode for the physical downlink shared channel and a transmission mode for the short physical downlink shared channel.

(Supplementary Note 22) The integrated circuit according to (Supplementary Note 21), wherein a downlink control information format to be monitored, a transmission scheme for the short physical downlink shared channel, and multiple antenna ports to be used for transmission of the short physical downlink shared channel are determined based on the transmission mode for the short physical downlink shared channel.

(Supplementary Note 23) The integrated circuit according to (Supplementary Note 21), wherein the transmission mode information includes a first parameter and a second parameter; the first parameter indicates the transmission mode for the physical downlink shared channel; and the second parameter indicates the transmission mode for the short physical downlink shared channel.

(Supplementary Note 24) The integrated circuit according to (Supplementary Note 21), wherein the transmission mode information includes one parameter; and the one parameter indicates transmission mode common information for the physical downlink shared channel and the short physical downlink shared channel.

INDUSTRIAL APPLICABILITY

An aspect of the present invention can be used for a communication system, a communication apparatus (such as a mobile phone apparatus, a base station apparatus, a wireless LAN apparatus, and a sensor device), an integrated circuit (such as a communication chip), a program, and the like, for example.

REFERENCE SIGNS LIST 1, 1A, 1B, 1C Terminal apparatus
3 Base station apparatus
101 Processing unit
1011 Radio resource control unit
1013 Scheduling information interpretation unit
1015 sTTI control unit
103 Control unit
105 Reception unit
1051 Decoding unit
1053 Demodulation unit
1055 Demultiplexing unit
1057 Radio receiving unit
1059 Channel measurement unit
107 Transmission unit
1071 Coding unit
1073 Modulating unit
1075 Multiplexing unit
1077 Radio transmitting unit
1079 Uplink reference signal generation unit
109 Transmit and receive antenna
301 Processing unit
3011 Radio resource control unit
3013 Scheduling unit
3015 sTTI control unit
303 Control unit
305 Reception unit
3051 Decoding unit
3053 Demodulation unit
3055 Demultiplexing unit
3057 Radio receiving unit
3059 Channel measurement unit
307 Transmission unit
3071 Coding unit
3073 Modulating unit
3075 Multiplexing unit
3077 Radio transmitting unit
3079 Downlink reference signal generation unit
309 Transmit and receive antenna

The invention claimed is:

1. A terminal apparatus comprising:
receiving circuitry configured to receive a first parameter indicating a first transmission mode of a physical downlink shared channel (PDSCH) and a second parameter indicating a second transmission mode of a short PDSCH (sPDCCH); and
decoding circuitry configured to attempt to decode a physical downlink control channel (PDCCH) with a first DCI format, the first DCI format corresponding to the first transmission mode, wherein
the decoding circuitry is configured to, in a case that a third parameter is configured, attempt to decode a short PDCCH (sPDCCH) with a second DCI format in a UE specific search space (USS), the second DCI format corresponding to the second transmission mode; and
the USS is a set of sPDCCH candidates.

2. The terminal apparatus according to claim 1, wherein
the third parameter indicates at least a length of a short transmission time interval (sTTI);
the sPDCCH is mapped to the sTTI; and
the length of the sTTI is 2, or 7 orthogonal frequency division multiplexing (OFDM) symbols.

3. A base station apparatus comprising:
radio resource control circuitry configured to transmit a first parameter indicating a first transmission mode of a physical downlink shared channel (PDSCH) and a second parameter indicating a second transmission mode of a short PDSCH (sPDCCH); and
transmitting circuitry configured to transmit a physical downlink control channel (PDCCH) with a first DCI format, the first DCI format corresponding to the first transmission mode, wherein
the transmitting circuitry is configured to, in a case that a third parameter is configured, transmit a short PDCCH (sPDCCH) with a second DCI format in a UE specific search space (USS), the second DCI format corresponding to the second transmission mode; and
the USS is a set of short PDCCH candidates.

4. The base station apparatus according to claim 3, wherein
the third parameter indicates at least a length of a short transmission time interval (sTTI),
the sPDCCH is mapped to the sTTI, and
the length of the sTTI is 2, or 7 orthogonal frequency division multiplexing (OFDM) symbols.

5. A communication method for a terminal apparatus comprising:
receiving a first parameter indicating a first transmission mode of a physical downlink shared channel (PDSCH) and a second parameter indicating a second transmission mode of a short PDSCH (sPDCCH);
attempting to decode a physical downlink control channel (PDCCH) with a first DCI format, the first DCI format corresponding to the first transmission mode; and
in a case that a third parameter is configured, attempting to decode a short PDCCH (sPDCCH) with a second DCI format in a UE specific search space (USS), the second DCI format corresponding to the second transmission mode, wherein
the USS is a set of sPDCCH candidates.

6. A communication method for a base station apparatus comprising:
transmitting a first parameter indicating a first transmission mode of a physical downlink shared channel (PDSCH) and a second parameter indicating a second transmission mode of a short PDSCH (sPDSCH);
transmitting a physical downlink control channel (PDCCH) with a first DCI format, the first DCI format corresponding to the first transmission mode; and
in a case that a third parameter is configured, transmitting a short PDCCH (sPDCCH) with a second DCI format in a UE specific search space (USS), the second DCI format corresponding to the second transmission mode, wherein
the USS is a set of short PDCCH candidates.

* * * * *